United States Patent
Abe et al.

(10) Patent No.: US 10,319,020 B2
(45) Date of Patent: Jun. 11, 2019

(54) INFORMATION PROCESSING DEVICE, INFORMATION PROCESSING METHOD, PROGRAM AND STORAGE MEDIUM

(71) Applicant: RAKUTEN, INC., Tokyo (JP)

(72) Inventors: Taichi Abe, Tokyo (JP); Chisa Yamamoto, Tokyo (JP)

(73) Assignee: Rakuten, Inc., Tokyo (JP)

( * ) Notice: Subject to any disclaimer, the term of this patent is extended or adjusted under 35 U.S.C. 154(b) by 597 days.

(21) Appl. No.: 14/785,798

(22) PCT Filed: Mar. 4, 2014

(86) PCT No.: PCT/JP2014/055486
§ 371 (c)(1),
(2) Date: Oct. 20, 2015

(87) PCT Pub. No.: WO2015/132886
PCT Pub. Date: Sep. 11, 2015

(65) Prior Publication Data
US 2016/0078517 A1 Mar. 17, 2016

(51) Int. Cl.
*G06Q 30/06* (2012.01)
*G06F 16/245* (2019.01)
(Continued)

(52) U.S. Cl.
CPC ....... *G06Q 30/0625* (2013.01); *G06F 16/245* (2019.01); *G06F 16/2425* (2019.01); *G06F 16/285* (2019.01); *G06Q 30/0641* (2013.01)

(58) Field of Classification Search
None
See application file for complete search history.

(56) References Cited

U.S. PATENT DOCUMENTS 7,389,294 B2 * 6/2008 Kotas ............... G06Q 10/087
705/28
8,688,535 B2 * 4/2014 Yuan ................ G06F 17/30864
705/26.1
(Continued)

FOREIGN PATENT DOCUMENTS

| JP | 2007/011637 A | * | 1/2007 |
| JP | 4300301 B2 | | 7/2009 |
| JP | 5587526 B1 | | 9/2014 |

OTHER PUBLICATIONS

Yang, Y., "Theory and Mining of Association Rules over Large Databases," Dissertation, Ohio State University, 2000.*
(Continued)

*Primary Examiner* — Nicholas D Rosen
(74) *Attorney, Agent, or Firm* — Sughrue Mion, PLLC

(57) ABSTRACT

A product introduction support device includes a display control part, a keyword extraction part, a sorting word selection part, and a group presentation part. The display control part is configured to create display control information to arrange a plurality of selected products in a browsable state on a web. The keyword extraction part is configured to extract a keyword representing an attribute for each of the plurality of selected products. The sorting word selection part is configured to select at least one keyword common to or similar to a plurality of products among the keywords extracted by the keyword extraction part as a sorting word. The group presentation part is configured to perform processing of presenting candidates for a product group that are bracketable by the sorting word among the plurality of selected products.

32 Claims, 17 Drawing Sheets

(51) Int. Cl.
*G06F 16/28* (2019.01)
*G06F 16/242* (2019.01)

(56) References Cited

U.S. PATENT DOCUMENTS

| | | | | |
|---|---|---|---|---|
| 8,782,049 B2* | 7/2014 | Okamoto | .......... | G06F 17/30014 |
| | | | | 704/9 |
| 9,146,910 B2* | 9/2015 | Gu | .................... | G06F 17/30873 |
| 9,262,056 B2* | 2/2016 | Leon | ................. | G06F 17/30876 |
| 2003/0204449 A1 | 10/2003 | Kotas et al. | | |
| 2006/0224406 A1* | 10/2006 | Leon | ................. | G06F 17/30876 |
| | | | | 705/26.1 |
| 2009/0055390 A1* | 2/2009 | Maeda | .............. | G06F 17/30707 |
| 2011/0246464 A1* | 10/2011 | Okamoto | .......... | G06F 17/30014 |
| | | | | 707/737 |
| 2011/0288956 A1* | 11/2011 | Yuan | ................. | G06F 17/30864 |
| | | | | 705/26.61 |
| 2013/0262979 A1* | 10/2013 | Gu | .................... | G06F 17/30873 |
| | | | | 715/234 |
| 2015/0213536 A1* | 7/2015 | Liu | ................... | G06F 17/30342 |
| | | | | 705/26.62 |
| 2015/0371312 A1* | 12/2015 | Matsuura | ........... | G06Q 30/0625 |
| | | | | 705/26.62 |

OTHER PUBLICATIONS

International Search Report of PCT/JP2014/055486, dated Apr. 28, 2014. [PCT/ISA/210].

* cited by examiner

FIG. 13A

KEYWORD DB

| KEYWORD | WORDS SUGGESTED FROM KEYWORDS | | | |
|---|---|---|---|---|
| RED | WARM | HOT | STIMULATIVE | ... |
| BLUE | COOL | COLD | SOOTHING | ... |
| CHAIR | SIT | REST | STEP STOOL | ... |
| OUTDOOR | FIELDS | NATURE | REFLESH | ... |
| ⋮ | ⋮ | ⋮ | ⋮ | |

FIG. 13B

KEYWORD DB

PRODUCT ID : 000003
PRODUCT ID : 000002
PRODUCT ID : 000001

| PRODUCT NAME | DINING CHAIR | | | |
|---|---|---|---|---|
| CHAIR | RED | EUROPE | INTERIOR | |
| SIT | REST | MEAL | WARM | |
| WOOD | NATURAL WOOD | DURABLE | TEA TIME | |
| ⋮ | ⋮ | ⋮ | ⋮ | |

INFORMATION PROCESSING DEVICE, INFORMATION PROCESSING METHOD, PROGRAM AND STORAGE MEDIUM

CROSS REFERENCE TO RELATED APPLICATIONS

This application is a National Stage of International Application No. PCT/JP2014/055486 filed Mar. 4, 2014, the contents of all of which are incorporated herein by reference in their entirety.

TECHNICAL FIELD

The present invention relates to a technical field of an information processing device, an information processing method, a program, and a storage medium regarding an electronic commerce (e-commerce) by which a user purchases a product via a communications network.

CITATION LIST

Patent Literature

Patent Literature 1: Japanese Patent No. 4300301

BACKGROUND ART

In association with development of a network technology, a way of shopping has been changing. Specifically, a form of directly going to a shop to purchase a product has been transitioned to a form of purchasing a product at home via a communications network such as the Internet. For a company that sells products, to sell the company's products, the products need to catch many people's attention as much as possible. Conventionally, for example, by increasing advertisements by commercial and new shops, the purpose has been partially achieved. However, in association with the above-described change, an effect of attracting people's attention to the products on the communications network has been outstanding. Under such circumstances, for example, Patent Literature 1 has proposed an efficient creation of a product listing by a product introducer. Accordingly, a large number of product introducers list identical products and introduce the products via the communications network. That is, the products come under the public via the communications network, promoting the sales of the products.

SUMMARY OF INVENTION

Technical Problem

Like opening a select shop, by introducing products selected by product introducers themselves on the communications network, the products are advertised, promoting the sales of the products. In this case, by adding originality of a product introducer to a product introduction page, even if an identical product is introduced, an impression that a visitor receives changes. Therefore, an extent of sales promotion of products differs. Further, if a purchaser of products differs, a product introduction page from which the purchaser wants to purchase the product is also different. For example, one purchaser purchases a product from a product introduction page mentioning the price. Another purchaser purchases a product from a product introduction page mentioning the performance of the product. That is, it is expected that introduction of products from various points of view by various product introducers further promotes the sales of the products.

Therefore, an object of the present invention is to provide an environment that gives ideas to group products from various points of view to a product introducer on the product introduction page on which the products are introduced by the product introducer to promote grouping products with uniformity.

Solution to Problem

First, an information processing device according to the present invention includes a display control part, a keyword extraction part, a sorting word selection part, and a group presentation part. The display control part is configured to create display control information to arrange a plurality of selected products in a browsable state on a web. The keyword extraction part is configured to extract a keyword representing an attribute for each of the plurality selected products. The sorting word selection part is configured to select at least one keyword common to or similar to a plurality of products among the keywords extracted by the keyword extraction part as a sorting word. The group presentation part is configured to perform processing of presenting candidates for a product group that are bracketable by the sorting word among the plurality of selected products. This gives ideas to group products to a user, providing an environment of promoting grouping products with uniformity.

Second, with the above-described information processing device according to the present invention, the following is preferable. The information processing device includes a name determining part. The name determining part is configured to perform name determination processing to compare a group name input for a product group with unrecommended names. The name determining part is configured to perform unrecommended name handling processing when this name determination processing determines the group name as an unrecommended name. The comparison with unrecommended names provides an environment to assign a unique group name to a product group. Further, this prevents assignment of a name such as a name offensive to public order and morals as a group name.

Third, with the above-described information processing device according to the present invention, the following is preferable. The name determination processing is configured to determine the input group name as an unrecommended name when the input group name is formed of the sorting word alone. The determination of a group name formed of a sorting word alone as an unrecommended name prevents the easy assignment of group name.

Fourth, with the above-described information processing device according to the present invention, the following is preferable. The name determination processing is configured to determine the input group name as an unrecommended name when a main part of the input group name is formed of a sorting word and a fixed phrase.

The determination of the main part of the group name formed of a sorting word and a fixed phrase as an unrecommended name prevents the easy assignment of product group name.

Fifth, with the above-described information processing device according to the present invention, the following is preferable. The name determination processing is configured to determine the input group name as an unrecommended name when the input group name matches a fixed expression.

The determination of the group name formed of a fixed expression alone as an unrecommended name prevents the assignment of a group name that is ordinary and therefore cannot attract the attention of users who will purchase products.

Sixth, with the above-described information processing device according to the present invention, the following is preferable. The name determination processing is configured to determine the input group name as an unrecommended name when the input group name is used as a group name assigned to an existing product group by a certain count or more.

This assures product introducers who have thought a novel name and a splendid name of an effect of a certain level of product introduction. This also prevents another user from effortlessly imitating the group names.

Seventh, with the above-described information processing device according to the present invention, the following is preferable. The unrecommended name handling processing is configured to perform alert processing to notify that the input group name is an unrecommended name.

This notifies the product introducer of the fact that the input group name is an unrecommended name.

Eighth, with the above-described information processing device according to the present invention, the following is preferable. The unrecommended name handling processing is configured to perform name reassignment processing to request renaming the group name.

This provides an environment of promoting the input of a further unique group name.

Ninth, with the above-described information processing device according to the present invention, the following is preferable. The group presentation part is configured to present candidates for the product group by presenting the sorting word.

Directly showing the keywords as the attribute information common to the products provides the environment that evokes a clear picture of a product group.

Tenth, with the above-described information processing device according to the present invention, the following is preferable. The group presentation part is configured to filter and display respective products belonging to the product groups based on the sorting words, depending on the sorting words.

Since this displays only the product-grouped products, providing an environment that evokes a clearer picture of a product group.

Eleventh, with the above-described information processing device according to the present invention, the following is preferable. When a plurality of the sorting words are presented, the group presentation part highlights the sorting word of the product group to which many products belong to present the sorting word.

Highlighting the sorting word to which many products belong provides an environment where a product group to which many more products belong is likely to be created. This introduces the products with uniformity among the introduced products.

Twelfth, with the above-described information processing device according to the present invention, the following is preferable. The keyword extraction part is configured to extract keywords also from information on a product introducer who introduces a product. The sorting word selection part is configured to select the sorting word from words including the keyword extracted from the information on the product introducer.

Accordingly, this provides an environment of promoting the input of the group name unique to the product introducer.

Thirteenth, with the above-described information processing device according to the present invention, the following is preferable. The keyword extraction part is configured to acquire a word suggested from the keyword together with the extraction of the keyword.

The acquisition of the words suggested from the keywords presents a variety of sorting words when product groups are presented.

Fourteenth, with the above-described information processing device according to the present invention, the following is preferable. The sorting word selection part is configured to further select a common or a similar keyword among respective products belonging to the bracketed product group as a sub-sorting word. The group presentation part is configured to present candidates for a product group that are bracketable by the sorting word and the sub-sorting word.

Further presenting the sub-sorting word among the bracketed product group provides an environment where a product group with further narrowed-down criteria can be proposed.

Fifteenth, with the above-described information processing device according to the present invention, the following is preferable. The keyword extraction part is configured to reflect a situation unique to a product introducer to extract a keyword unique to the product introducer assigned to a product. The sorting word selection part is configured to select the sorting word from keywords including the keyword unique to the product introducer.

Selecting the sorting word based on the keywords unique to a product introducer and presenting candidates for a product group provide an environment of creating a product group unique to the product introducer.

Sixteenth, with the above-described information processing device according to the present invention, the following is preferable. The display control part is configured to create display control information. The display control information is configured to display an option to select a private group state and a public group state. In the private group state, that a product group selected from the presented candidates for a product group is bracketed by a sorting word is not visible to others on the web. In the public group state that a product group is bracketed by a sorting word is visible to others on the web.

Providing to a product introducer the options to select whether to show the product-grouped state to purchasers on the web or not provides an environment where the state of a product group to which the product introducer has not decided whether to product group or not can be stored.

An information processing method according to the present invention includes: creating display control information to arrange a plurality of selected products in a browsable state on a web; extracting a keyword representing an attribute for each of the plurality of selected products; selecting at least one keyword common to or similar to a plurality of products among the extracted keywords as a sorting word; and presenting candidates for a product group that are bracketable by the sorting word among the plurality of selected products.

This information processing method gives ideas to group products to a user, establishing an environment of promoting grouping products with uniformity.

A program according to the present invention is a program configured to cause an information processing device to perform processing performed as the information processing method.

A storage medium according to the present invention is a storage medium storing the program. These program and storage medium achieve the above-described information processing device.

Advantageous Effects of Invention

According to the present invention, the environment where ideas to group products from the various points of view are given to a product introducer to promote grouping products with uniformity can be provided.

BRIEF DESCRIPTION OF THE DRAWINGS

FIGS. 13A and 13B are drawings illustrating exemplary keyword DBs;

DESCRIPTION OF EMBODIMENTS

Figure 1:
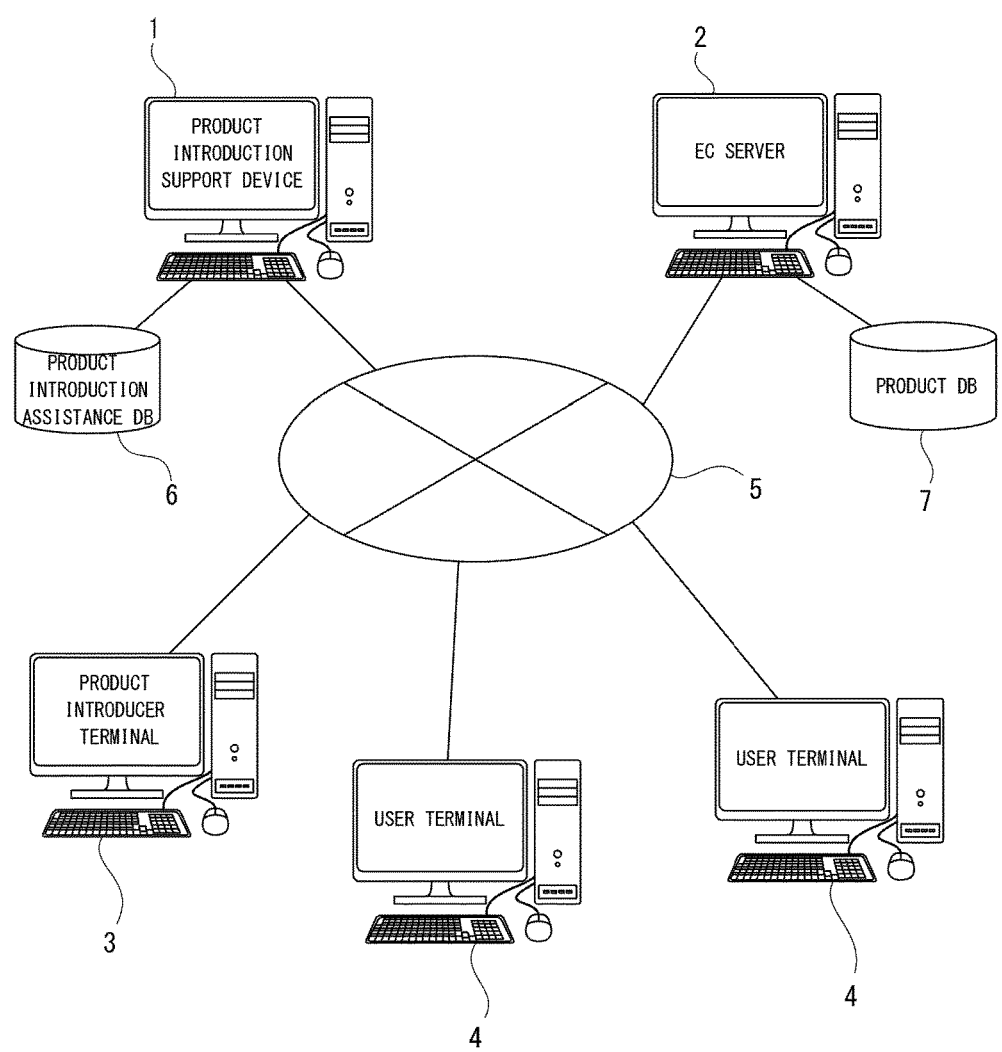
FIG. 1 is a drawing illustrating an overall configuration of embodiments of the present invention.

The following describes embodiments in the order listed below.
1. Overall Configuration
2. Hardware Configuration
3. Flow of Processing
4. Exemplary Name Determination Processing
4-1. First Exemplary Processing
4-2. Second Exemplary Processing
4-3. Third Exemplary Processing
4-4. Fourth Exemplary Processing
5. Modifications
6. Summary
7. Program and Storage Medium 1. Overall Configuration The following describes an overall configuration including an information processing device according to the embodiments with reference to FIG. 1 and FIG. 2.

To distinguish a user who has a web page for product introduction of himself/herself for introducing products and a user who purchases products from a page where products are introduced, the following designates the user who introduces the products as a product introducer and the user who purchases the products simply as a user. A product introduction support device 1 as embodiments of an information processing device of the present invention, an Electronic Commerce (EC) server 2, a product introducer terminal 3, and user terminals 4, 4, . . . , are mutually communicatively connected respectively via a communications network 5.

The configuration of the communications network 5 is not especially limited. For example, the Internet, an intranet, an extranet, a Local Area Network (LAN), a Community Antenna TeleVision (CATV) communications network, a Virtual Private Network, a telephone network, a mobile telecommunications network, a satellite communications network, or a similar network is assumed.

Various examples of a transmission medium constituting the all or a part of the communications network 5 are also assumed. For example, a wire system, such as the Institute of Electrical and Electronics Engineers (IEEE) 1394, a Universal Serial Bus (USB), a power-line carrier, and a telephone line, an infrared radiation, such as an Infrared Data Association (IrDA), and also a wireless system, such as the Bluetooth (registered trademark), the 802.11 wireless, a mobile phone network, a satellite channel, and a digital terrestrial network are applicable.

The product introduction support device 1 is a device that provides a product introducer with a product introduction page. The product introduction support device 1 provides to a user who purchases a product various functions to search and browse product introduction pages. Further, the product introduction support device 1 has a function that extracts a common attribute from a group of products selected by the product introducer as a sorting word and presents the sorting word to a product introducer. When the product introducer names the group of products (hereinafter referred to as "a product group") having the common attribute, the product introduction support device 1 is a device that has a function of grouping the group of products. Further, the product introduction support device 1 performs information acquisition processing on the EC server 2 to acquire information on the product.

Figure 2:
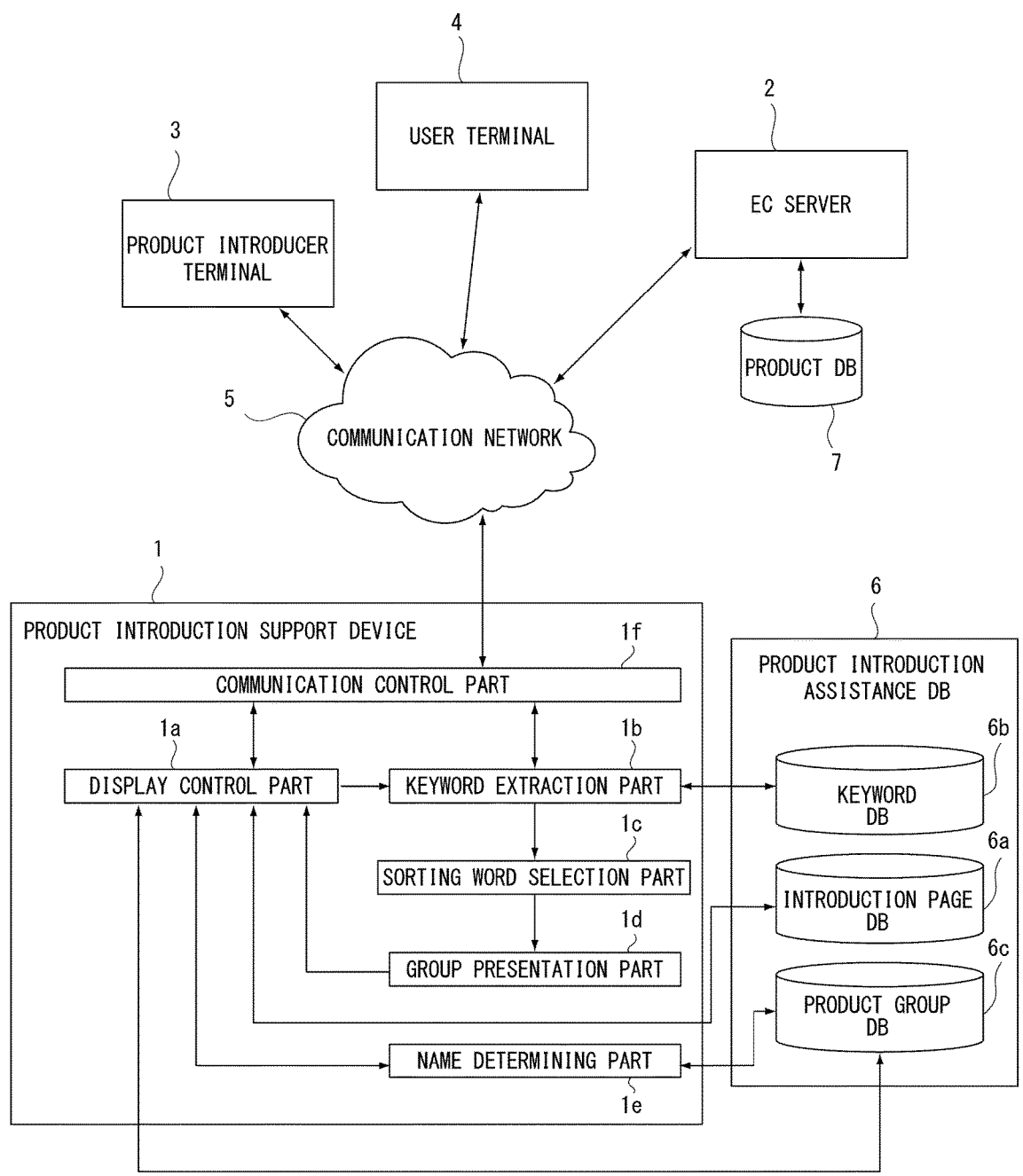
FIG. 2 is a drawing illustrating an overall configuration including a block diagram of a product introduction support device of the embodiments.

The product introduction support device 1 is connected to a product introduction assistance Data Base (DB) 6. The product introduction assistance DB 6 stores various information required to introduce products and group a group of products. The product introduction assistance DB 6, as illustrated in FIG. 2, includes an introduction page DB 6a, a keyword DB 6b, and a product group DB 6c. The introduction page DB 6a stores the configuration of a product introduction page and product information of arranged products. The keyword DB 6b stores keyword information indicative of the attribute of a product or similar information. The product group DB 6c stores names assigned to the product groups arranged on the introduction page by each product introducer and similar information.

The product introduction support device 1, as illustrated in FIG. 2, includes a display control part 1a, a keyword extraction part 1b, a sorting word selection part 1c, a group presentation part 1d, a name determining part 1e, and a communication control part 1f.

The display control part 1a performs processing of creating a program source code as display control information. The program source code arranges a group of products selected by a product introducer on a web page so as to be browsable by a user. As described later, the display control part 1a performs processing of creating a program source code. The program source code arranges a grouped group of products product on the web page such that it is clear that the grouped group of products are grouped.

The display control part 1a is connected to the introduction page DB 6a. This allows acquiring and updating the configuration of the product introduction page and the arranged product information.

Additionally, the display control part 1a is connected to the product group DB 6c. This allows updating information on the product group created by a product introducer.

The keyword extraction part 1b performs processing of extracting keywords representing attributes of each product selected by a product introducer.

Here, an attribute of product means information on a variety of aspects, such as a shape and a category of the product, a color, a size, a weight, a material, a usage, a place of use, time of use, a target age, a target gender, a target count of persons, an attribute of target person who uses the product (for example, a product for fathers and a product for mothers), a target area, a time required for use, a service life, and a price.

The keyword extraction part 1b also acquires words suggested from a keyword. For example, as attributes of a product, in the case of a product whose size being "small", the keyword extraction part 1b acquires "fine", "small article", "cute", and a similar word as words suggested from the attribute. As attributes of the product, in the case of a product whose target count of persons is "great count of people", the keyword extraction part 1b acquires phrases such as "noisily" and "lively. "Further, as attributes of a product, in the case of a product whose service life is "long", the keyword extraction part 1b acquires words such as "durable" and "for life."

Further, the keyword extraction part 1b extracts keywords reflecting a state and a condition unique to a product introducer. For example, when a product introducer assigns a personal keyword, "trip on the X day of the Y month", to a product brought to the trip, the keyword extraction part 1b performs the processing of extracting the personal keyword, "trip on the X day of the Y month." Accordingly, the product introduction support device 1 has a function that can assign unique keywords for each product introducer.

The above-described attributes of the product, words suggested from the attribute, and keywords unique to the product introducer, for example, can be acquired from the product information and a product comment by a product introducer, which are managed by the EC server 2, or similar information. Besides, it is also possible to acquire attributes, words, and keywords using review information on a product associated with a Social Networking Service (SNS) site, price information and review information acquired from price providing service of the product, service for providing product information for a Point Of Sale system (POS system), or similar information.

An example of acquisition of a suggested word is that in the case where a composition of product explanation includes a wording "red like X", as a word suggested from the "red", "X" can be acquired.

As another example, a method that the keyword DB 6b preliminary stores suggested words as a list is available.

These attributes and words are put together for each product and are stored as attribute information that the product has in the keyword DB 6b of the product introduction assistance DB 6. The keywords unique to a product introducer associated with a product may be associated with the product information arranged on a product introduction page and may be stored in the introduction page DB 6a.

The keyword extraction part 1b is connected to the display control part 1a such that the information on the product selected by a product introducer can be acquired from the display control part 1a, thus ensuring execution of the above-described control. The keyword extraction part 1b is connected to the keyword DB 6b, ensuring acquisition of the keywords of a product and the words suggested from the keywords.

The sorting word selection part 1c performs processing of selecting a keyword common to a group of products as a sorting word among the keywords extracted by the keyword extraction part 1b for each product selected by a product introducer. At this time, in the case where the keywords unique to a product introducer are assigned and there are keywords unique to the product introducer common to the plurality of products, the keywords unique to the product introducer are also selected as a sorting word. In the case where the product having a keyword "red" and a product having a keyword "vermilion" are present, the sorting word selection part 1c may determine that both keywords are similar and may perform processing of selecting "red" as a sorting word that brackets both products. For example, the keyword DB 6b stores a synonym list, and the sorting word selection part 1c compares a sorting word with the listed keywords. Thus, the sorting word selection part 1c determines whether two keywords are similar or not.

The processing of determining the products having these alike keywords as the identical product group may be performed when the count of products having the identical keyword as the attribute is small.

The sorting word selection part 1c is connected so as to ensure receiving the information from the keyword extraction part 1b, ensuring receiving extracted keywords.

The group presentation part 1d performs processing of presenting the candidates for a product group that can be bracketed by a sorting word selected by the sorting word selection part 1c to a product introducer. In this case, the product introducer can check the product group candidates presented through a web browser started on the product introducer terminal 3.

The presentation of the candidates for a product group may be presented by, for example, displaying the products belonging to the candidates for a product group in a list. Alternatively, the candidates for a product group may be presented by displaying the sorting word of the candidates for a product group. For example, in the case of the former, photographs of products of "red chair", "red table", and "red carpet" are displayed to present the product group bracketed by a sorting word "red." In the case of the latter, the fact that there are "three" products belonging to the sorting word "red" is displayed to present the product group bracketed by the sorting word "red." Further, both the photographs and the attributes of products may be displayed. In this case, together with the photographs of the products, it is displayed that the sorting word is "red."

The group presentation part 1d is connected so as to ensure receiving the information from the sorting word selection part 1c, ensuring receiving the information on a sorting word.

In the case where a product introducer assigns a name (hereinafter referred to as a "product group name") to the product group, the name determining part 1e performs name determination processing to compare the name with an unrecommended name.

Especially, the name determining part 1e performs processing of determining whether the assigned product group name is not ordinary but provides individuality and originality of the product introducer or not. Further, the name determining part 1e determines whether from the product group name assigned to the product group by the product introducer, a name that slanders other people, a name offensive to public order and morals, and a name that includes a prohibited word on radio and television or a similar word are suggested upon or not.

The name determination processing compares a product group name input for a product group with unrecommended names. To enhance individuality and originality, an unrecommended name includes a name formed of a sorting word alone, a name whose main part is formed of a sorting word and a fixed phrase, a name formed of a fixed expression alone, a name used by a certain count or more as a product group name assigned to the existing product groups, and a similar name. As described above, the slandering name, the name offensive to public order and morals, the prohibited word on radio and television, and the similar word are determined as an unrecommended name. The following description omits explanations on the name determination processing targeting the name slandering other people, the name offensive to public order and morals, the prohibited word on radio and television, and the similar word, which are obviously unrecommended names. The following mainly describes the name determination processing targeting the name lacking individuality and originality.

For example, in the case where a product introducer simply names "red" to a product group having a sorting word "red", the name determination processing may determine the name as an unrecommended name.

In the case where the product group DB 6c stores wording frequently used as a fixed expression and a product group name input by a product introducer is identical to a fixed expression, the name determination processing may determine the product group name as an unrecommended name.

For example, in the case where the product group DB 6c stores a fixed expression "X item collection" and further a product introducer inputs "red item collection", the name determination processing determines the name as an unrecommended name. Further, in the case where the product group DB 6c stores the product group names assigned by all the product introducers and the product group name input by a product introducer matches the product group name stored in the product group DB 6c, the name determination processing may determine the product group name as an unrecommended name. In other words, if no product introducer assigns the group name identical to the product group name input by a product introducer, the name determination processing determines that the product group name is not an unrecommended name. In this case, an identical product group names may be allowed up to a certain count. For example, assume that an identical product group names are allowed up to five. When the fifth person assigns "red item collection", the name determination processing determines that the name is not an unrecommended name. Next, when the sixth person assigns "red item collection", the name determination processing determines the name as an unrecommended name.

The name determining part 1e is coupled to the display control part 1a so as to ensure execution of the reception of the product group name input by a product introducer, transmission of the result of the name determination of the product group name, and a similar operation. Further, the name determining part 1e is connected to the product group DB 6c so as to ensure the above-described respective processing.

The communication control part 1f performs control to communicate between the product introduction support device 1 and an external device via the communications network 5. The communication control part 1f performs processing of transmitting web page data created by the display control part 1a to the product introducer terminal 3 and the user terminal 4, control of communications when the keyword extraction part 1b acquires the product information via the EC server 2, or similar processing. Therefore, the communication control part 1f ensures the transmission and reception of the information with the display control part 1a and the keyword extraction part 1b.

When the user instructs placing an order via the product introduction support device 1, the EC server 2 performs processing of placing the order to an actual shop or a similar shop, processing of delivering products to respective users, or similar processing. As described above, the EC server 2 performs processing of transmitting the information on each product, a comment from a user, or similar information upon a request of information acquisition from the keyword extraction part 1b regarding the product. The EC server 2 is connected to a product DB 7. The product DB 7 stores the product information on each product and shop information.

The product introducer terminal 3 is a terminal used by a user who has a web page for product introduction of himself/herself to introduce products. The product introducer terminal 3 is a terminal connected to the product introduction support device 1 and is used for searching products to be introduced, arranging the products on the web page, and performing similar processing.

The user terminal 4 is connected to the product introduction support device 1. The user terminal 4 is a terminal used by a user to, for example, search and browse products to be purchased.

For an exemplary purpose, different names are assigned for the product introducer terminal 3 and the user terminal 4 but the names merely depend on whether a person using the terminal is a product introducer who is in a position of introducing the products or a user who is in a position of purchasing the products. Therefore, the configurations of the terminals and a similar specification are substantially identical between the product introducer terminal 3 and the user terminal 4.

2. Hardware Configuration

Figure 3:
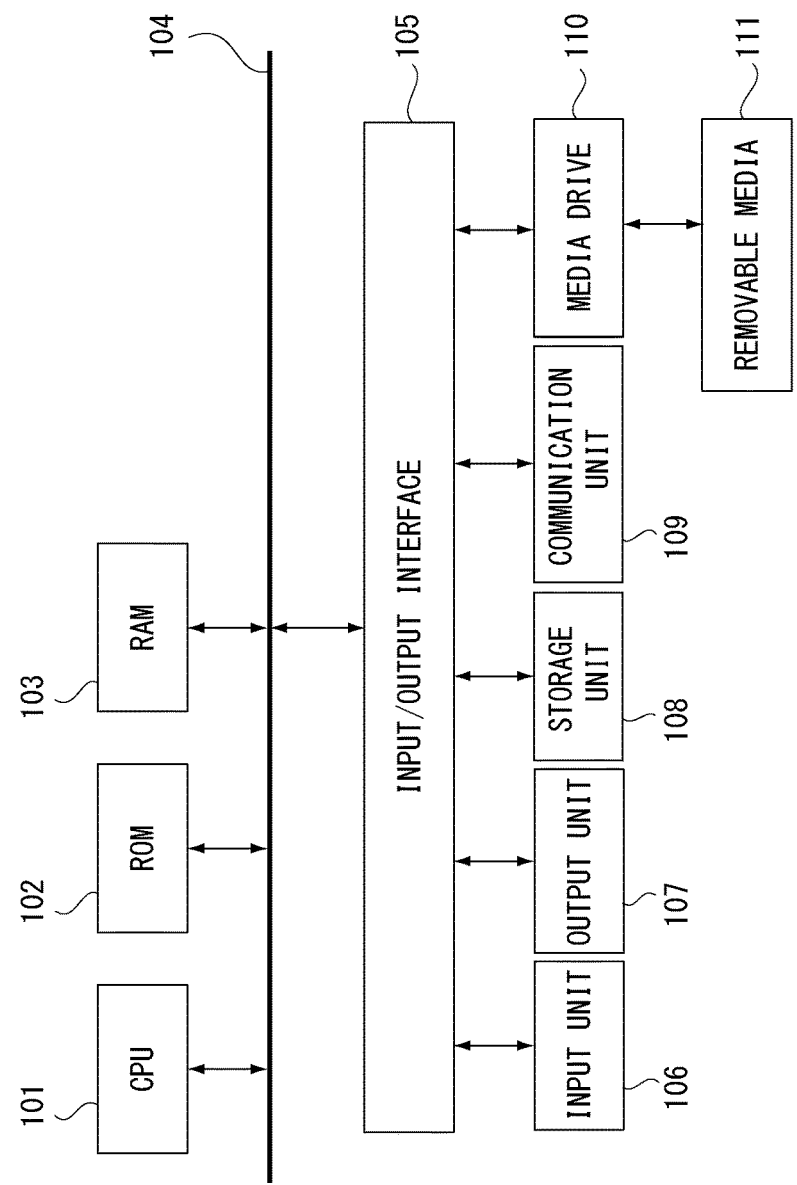
FIG. 3 is a block diagram of a computer of the embodiments.

FIG. 3 is a drawing illustrating exemplary hardware of the product introduction support device 1, the EC server 2, the product introducer terminal 3, and the user terminal 4, which are illustrated in FIG. 1. A central processing unit (CPU) 101 in a computer device in the respective servers and terminals performs various processing in association with a program stored in a Read Only Memory (ROM) 102 or a program loaded from a storage unit 108 to a Random Access Memory (RAM) 103. The RAM 103 also appropriately stores data required for the CPU 101 to perform the various processing or similar data.

The CPU 101, the ROM 102, and the RAM 103 are mutually coupled via a bus 104. An input/output interface 105 is also connected to this bus 104. To the input/output interface 105, an input unit 106, an output unit 107, the storage unit 108, and a communications unit 109 are coupled. The input unit 106 includes a keyboard, a computer mouse, a touchscreen, or a similar unit. The output unit 107 is formed of a display formed of a Liquid Crystal Display (LCD), a Cathode Ray Tube (CRT), an organic Electroluminescence (EL) panel, or a similar unit; and a speaker or a similar unit. The storage unit 108 is constituted of a Hard Disk Drive (HDD), a flash memory device, or a similar device. The communications unit 109 performs communications processing and communications between devices via the communications network 5.

Additionally, a media drive 110 is connected to the input/output interfaces 105 as necessary. A removal medium 111, such as a magnetic disk, an optical disk, a magneto-optical disk, or a semiconductor memory, is appropriately mounted. Thus, information is written to and read from the removal medium 111.

Such computer device uploads and downloads data and a program through communications with the communications unit 109 and can exchange data and a program via the removal medium 111.

Process operations based on various programs by the CPU 101 performs information processing and communications, which are described later, by the respective product introduction support device 1, EC server 2, product introducer terminal 3, and user terminal 4.

Each information processing device constituting the product introduction support device 1, the EC server 2, the product introducer terminal 3, and the user terminal 4 is not limited to a configuration of a single computer device as illustrated in FIG. 3. The information processing device may be constituted of a plurality of systemized computer devices. The plurality of computer devices may be systemized with a LAN or a similar network or may be remotely arranged with a Virtual Private Network (VPN) or a similar network using the Internet or a similar medium.

3. Procedure of Processing

Next, the following describes procedure where a product introducer connects to the product introduction support device 1, selects the products arranged on the product introduction page, creates a product group constituted of the products having a common keyword among the products, and names a product group name with reference to FIG. 4 to FIG. 11.

Figure 4:
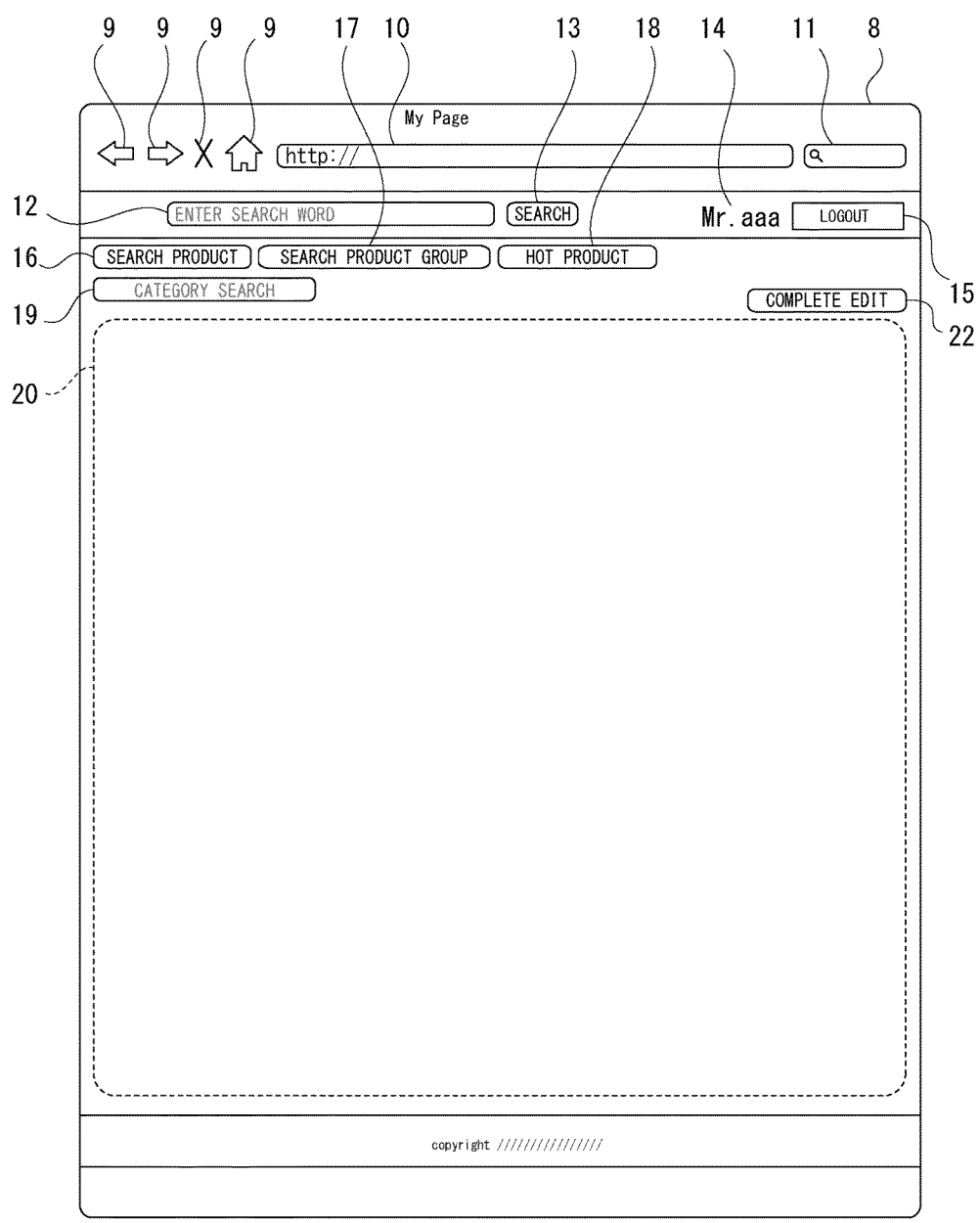
FIG. 4 is a drawing illustrating a screen displayed when browsing a product introduction page.

When the product introducer displays the product introduction page using a web browser 8 on the product introducer terminal 3, the web page illustrated in FIG. 4 is displayed. In this case, in response to the product introducer accessing the product introduction page, the product introduction support device 1 transmits Hyper Text Markup Language (HTML) data to display the product introduction page as illustrated in FIG. 4. This web page is an edit page for the product introducer to edit the product introduction page. To use various functions for product introduction assistance service by the product introducer, the edit page in FIG. 4 is in a state where a login to the service has been completed.

On the web browser 8, various icons 9, 9, . . . to change the displayed web page are arranged on the upper portion. Further, on the right side, an address display part 10 and a search form 11 are appropriately arranged. The address display part 10 displays a Uniform Resource Locator (URL) of the displayed web page. The search form 11 searches the web page.

On the lower side, a product search form 12, a Search button 13, a user name display part 14, and a Logout button 15 are arranged. The product search form 12 is for searching products from a product name, a product group name, a keyword, or a similar word. The user name display part 14 displays a user name. The Logout button 15 changes a login state to a logout state.

On the further lower side, a Search Product button 16, a Search Product group button 17, and a Search Hot Product button 18 are arranged. The Search Product button 16 jumps from the current web page to a web page for searching products. The Search Product group button 17 jumps from the current web page to the web page for searching product groups. The Search Hot Product button 18 searches a product that has gathered attention recently. Further, on the right side, a Complete Edit button 22 is arranged. The Complete Edit button 22 completes editing the product introduction page.

The search of a product group is to search a product group established by each product introducer. The search includes, for example, a search by a product group name and a search by a sorting word common to a product group.

The search of the product that has gathered attention recently includes, for example, searches of a product that has been searched many times, a product that has been purchased many times, and a product that has been introduced many times during the most recent one month.

Additionally, below these search buttons, a drop-down list form 19 to search a category is arranged. On the further lower area, an arranged product area 20 is arranged. The arranged product area 20 displays a list of products selected by a product introducer. FIG. 4 illustrates the state where the product introducer has not selected products yet. This indicates the state where no product is arranged on the arranged product area 20.

Figure 5:
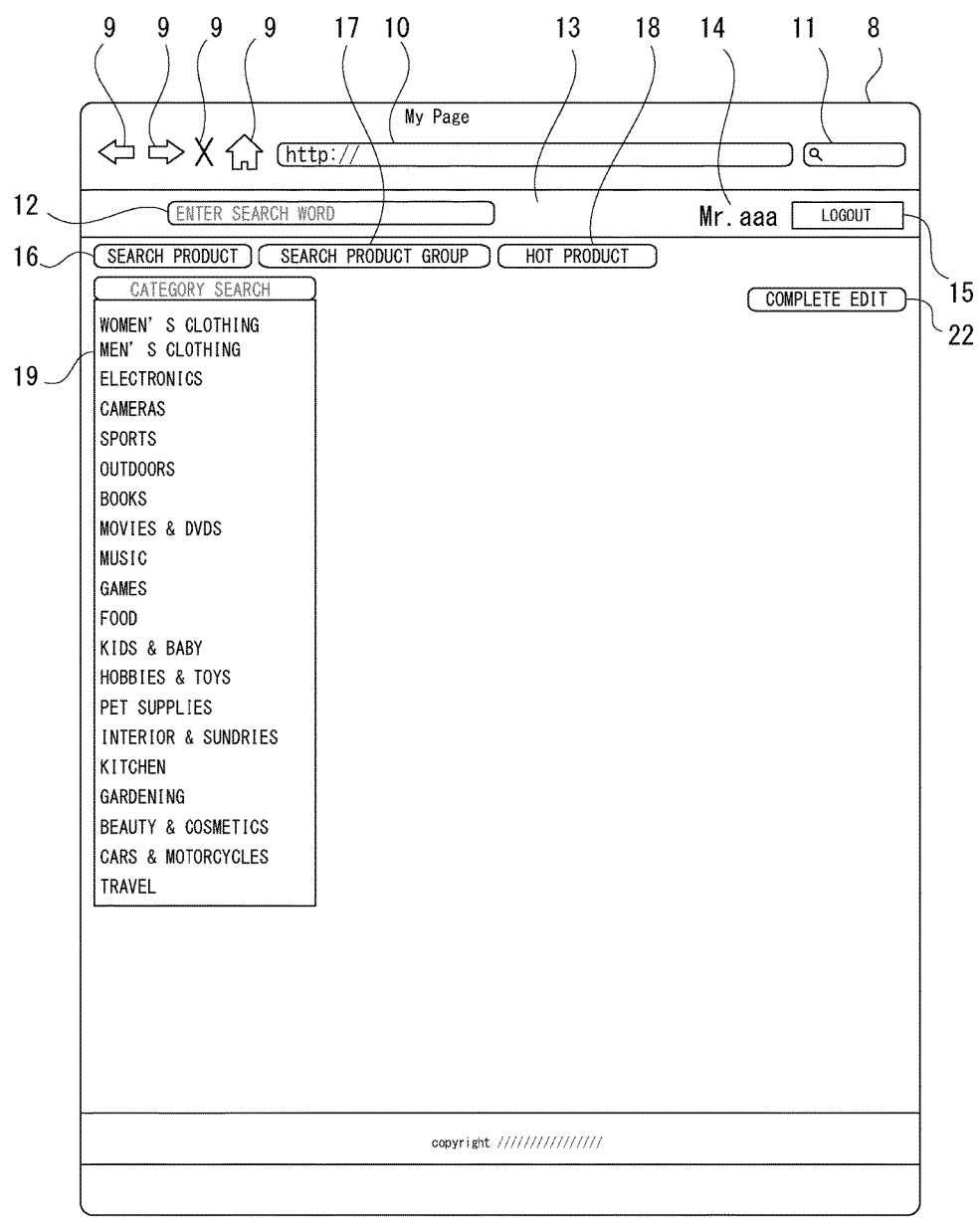
FIG. 5 is a drawing illustrating a screen when performing a category search.

Subsequently, FIG. 5 illustrates a state to search a category using the drop-down list form 19 in FIG. 4. The search using the drop-down list form 19 narrows down the range of categories, facilitating the search. Here, the drop-down list form 19 displays a comparatively broad category in a list. However, a further detailed category, such as a subcategory, may be displayed.

Figure 6:
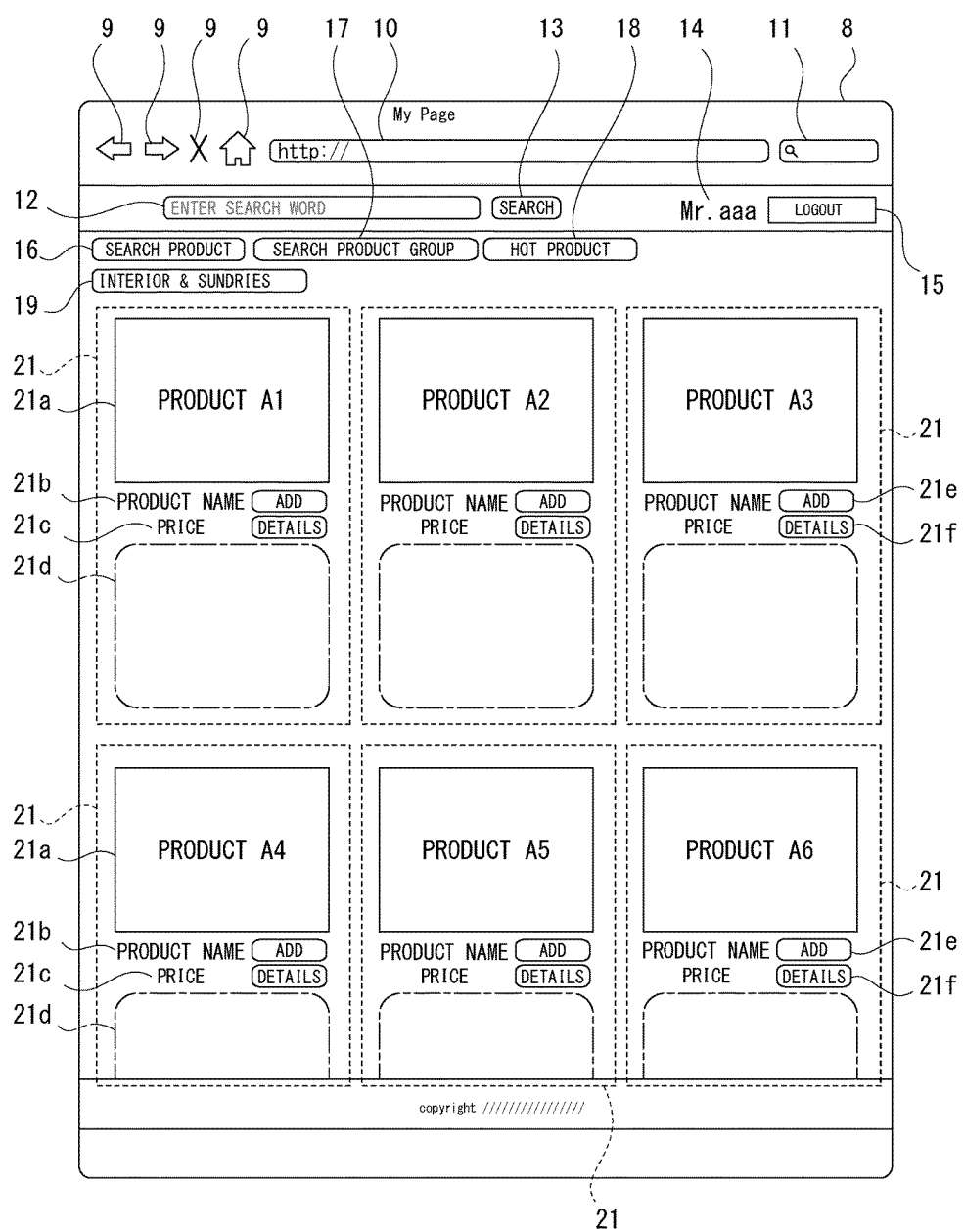
FIG. 6 is a drawing illustrating a screen displayed when performing a search.

Next, the following describes a state where "Interior/General Merchandise" is selected from the drop-down list in FIG. 5 and the page transitions to a search page illustrated in FIG. 6.

The search page illustrated in FIG. 6 displays information on respective products of a product A1 to a product A6 belonging to the "Interior/General Merchandise" category in a list. This list display is configured by arranging product information display areas 21 that display the respective product information as many as a count of products. The product information display area 21 each includes an image display part 21a, a product name display part 21b, a price display part 21c, an introductory composition display part 21d, an Add button 21e, and a Details button 21f. The image display part 21a displays the photograph and the illustration of a product. The product name display part 21b displays a product name. The price display part 21c displays the price of a product. The introductory composition display part 21d displays the introductory composition of a product. The Add button 21e adds a product to the product introduction page. The Details button 21f is to browse detailed information of the product.

A list of subcategories may be arranged on the search page in FIG. 6. Selecting from the subcategories may be able to perform a search further narrowing down a search target.

Figure 7:
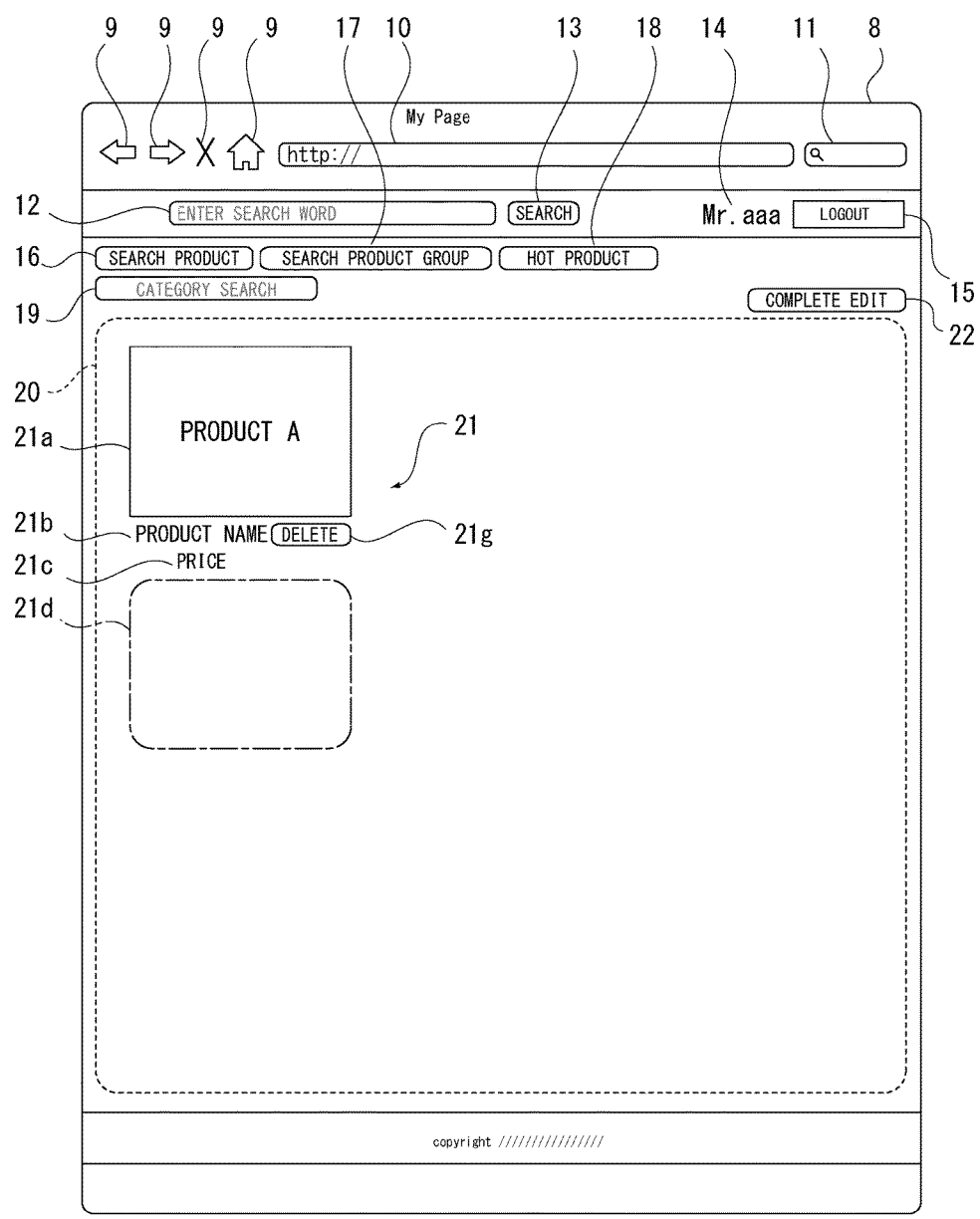
FIG. 7 is a drawing illustrating a state where a product is added to an edit page.

Pressing the Add button 21e for a product A1 on the search page transitions to the edit page illustrated in FIG. 7. A plurality of products may be able to be batch-added. In this case, for example, each product displayed on the search page in FIG. 6 includes a checkbox. Pressing the Add button 21e in the page batch-adds the products whose checkboxes are ON to the product introduction page.

The URL in FIG. 7 is identical to the URL of the edit page illustrated in FIG. 4. However, FIG. 7 differs in that the product A1, which is selected in the arranged product area 20 in FIG. 6, is newly arranged as a product A. The product information display area 21 displays the information on the product. The product information display area 21 includes the image display part 21a, the product name display part 21b, the price display part 21c, the introductory composition display part 21d, and a Delete button 21g. The Delete button 21g deletes a product from the arranged product area 20.

Figure 8:
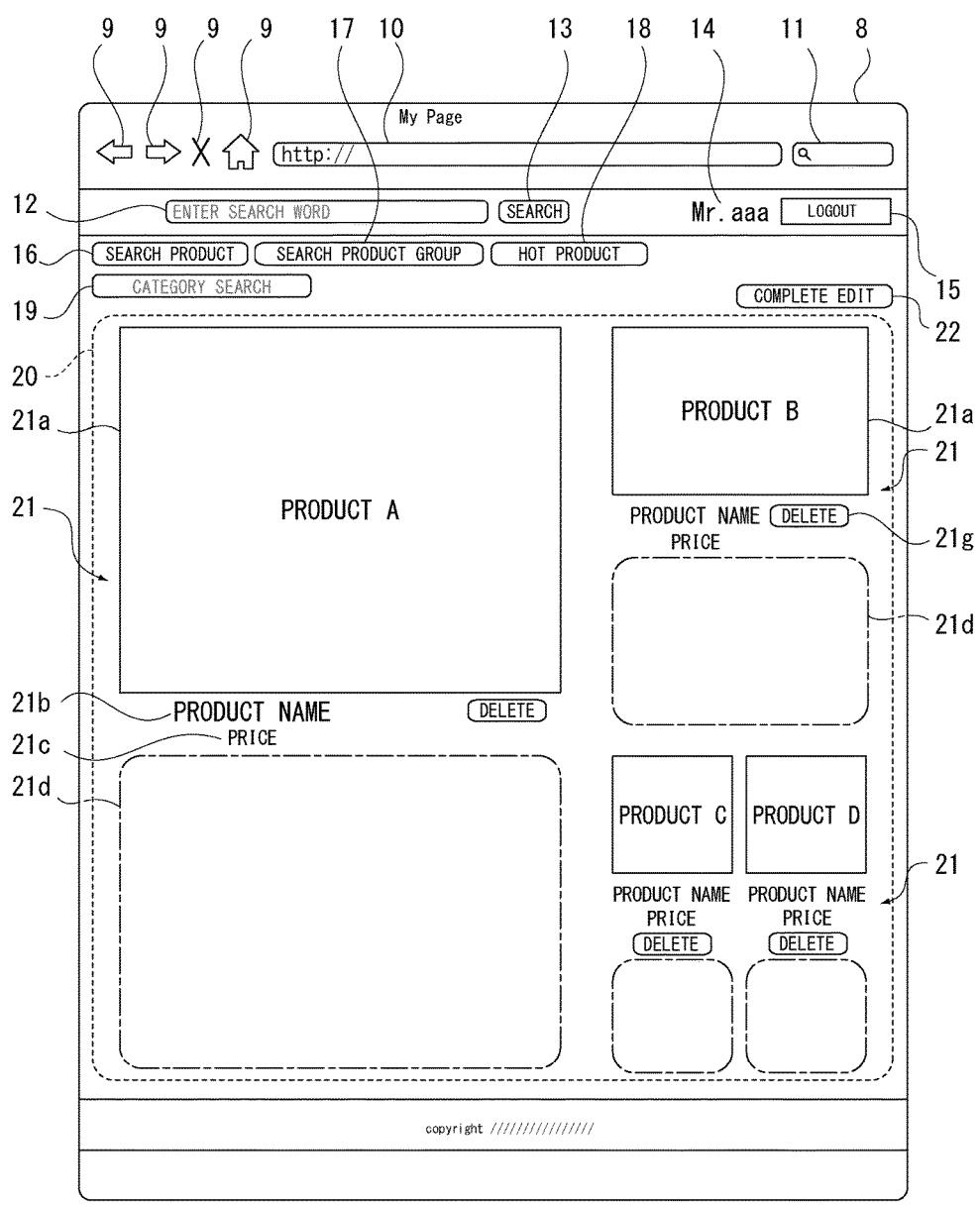
FIG. 8 is a drawing illustrating a state where a plurality of products are added to the edit page.

Whenever a product introducer presses the Add button 21e corresponding to a searched product, the product is newly added to the arranged product area 20. FIG. 8 illustrates a state where four products of the product A to a product D are added to the arranged product area 20 on the edit page by a product introducer.

The Delete button 21g displayed on the product information display area 21 in FIG. 7 and FIG. 8 is displayed when the product introducer edits the product introduction page of himself/herself (namely, the edit page). The Delete button 21g is not displayed when the user browses the product introduction page of the product introducer in a process of searching the product that the user wants to purchase.

In FIG. 8, among the four products, the product A to the product D, the product information display area 21 for the product A is displayed enlarged. This is just a layout reflecting the intent of the product introducer who wants to introduce the product A most; therefore, the product information display area 21 is not limited to be always arranged as illustrated in FIG. 8. For example, all the products may have the product information display area 21 of an identical size. Alternatively, depending on a size of an image displayed at the image display part 21a for each product, the size of the product information display area 21 may be determined. It is also possible to determine the order of arrangement and the position of the products arbitrarily by a product introducer.

Figure 9:
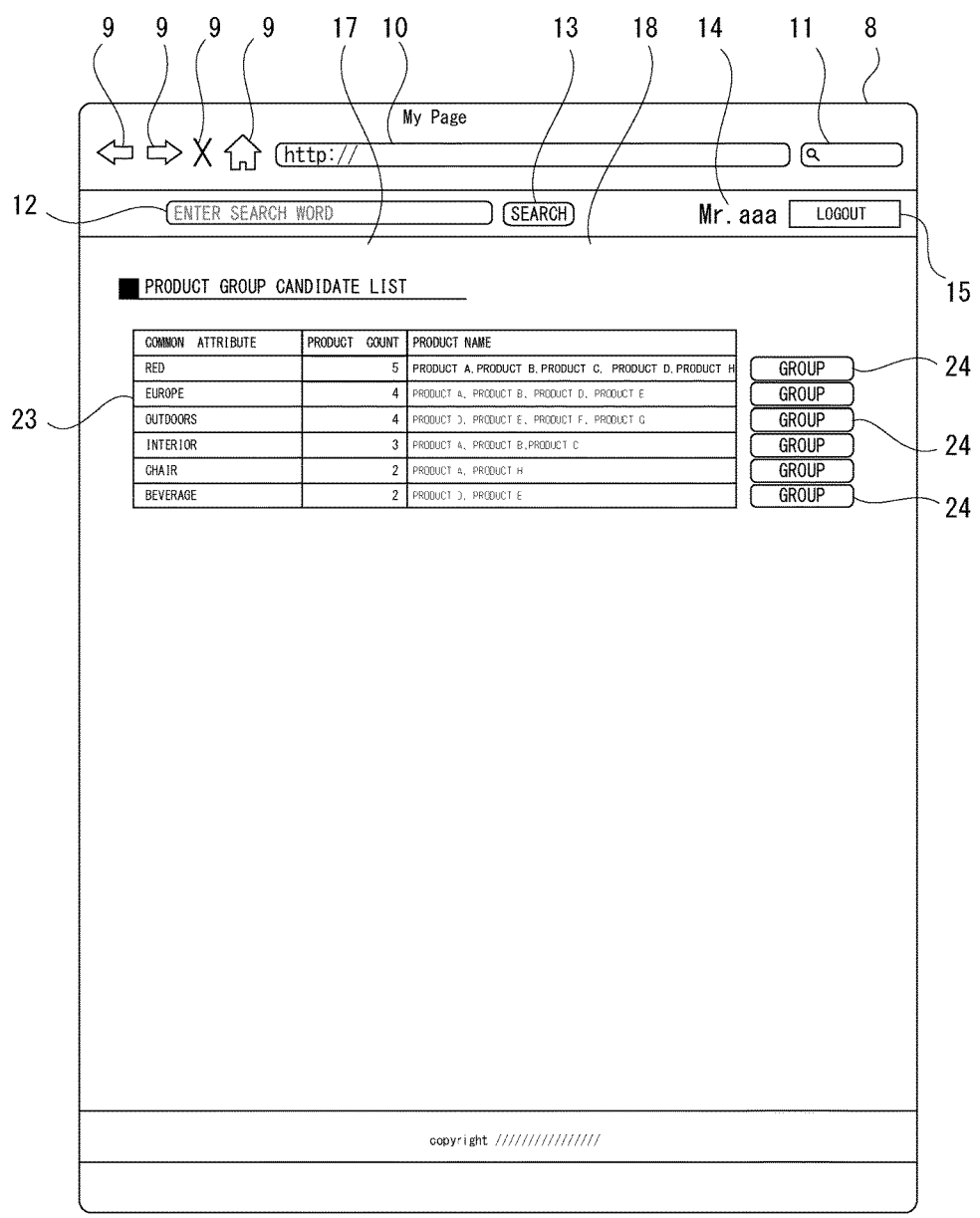
FIG. 9 is a drawing illustrating a screen on which candidates for a product group are presented.

Pressing the Complete Edit button 22 in the state of FIG. 8 transitions the page to a product group candidate presentation page illustrated in FIG. 9.

The product group candidate presentation page is a web page that displays the sorting words and the product information determined to be able to be grouped into the product groups by the product introduction support device 1 among the information on the products selected by a product introducer. Processing of grouping into product groups by the product introduction support device 1 will be described later.

Here, a table named product group candidate list 23 is displayed. For example, the table lists five products belonging to a sorting word "red." Similarly, the product group candidate list 23 displays the information on the products belonging to respective sorting words, "Europe", "out-doors", "interior", "chair", and "beverage" in a list. On the right side of each row of the product group candidate list 23, a Group button 24 is arranged. The Group button 24 actually groups the product group candidates.

The product group candidate list 23 may display the sorting words as the display of the product group candidates, and below the product group candidate list 23, all the products selected by the product introducer may be displayed. When the product introducer clicks the sorting word, the products belonging to the sorting word may be filtered and displayed.

Further, to display the product group candidates, the display regarding the product group candidate to which many products belong may be displayed in highlight by, for example, display in red letter.

In the case where further some products have another keyword in common among a series of products belonging to a certain sorting word, the other common keyword may be set as a sub-sorting word. The products belonging to the sub-sorting word may be presented to a product introducer. For example, a description will be given using FIG. 9 as an example. The products having a sorting word "red" as the common keyword are the products A, B, C, D, and H. Among them, the products A, B, and C have another common keyword "interior." Therefore, as the products that can be bracketed by the sorting word "red", the products A, B, C, D, and H are presented. As the products that can be bracketed by the sorting word "red" and the sub-sorting word "interior", the products A, B, and C may be presented.

Alternatively, only sorting words, counts of products belonging to each sorting word, and buttons for viewing products belonging to each sorting word may be displayed. Only when pressing the button for viewing products belonging to a sorting word, the list of the products belonging to the sorting word may be displayed.

Figure 10:
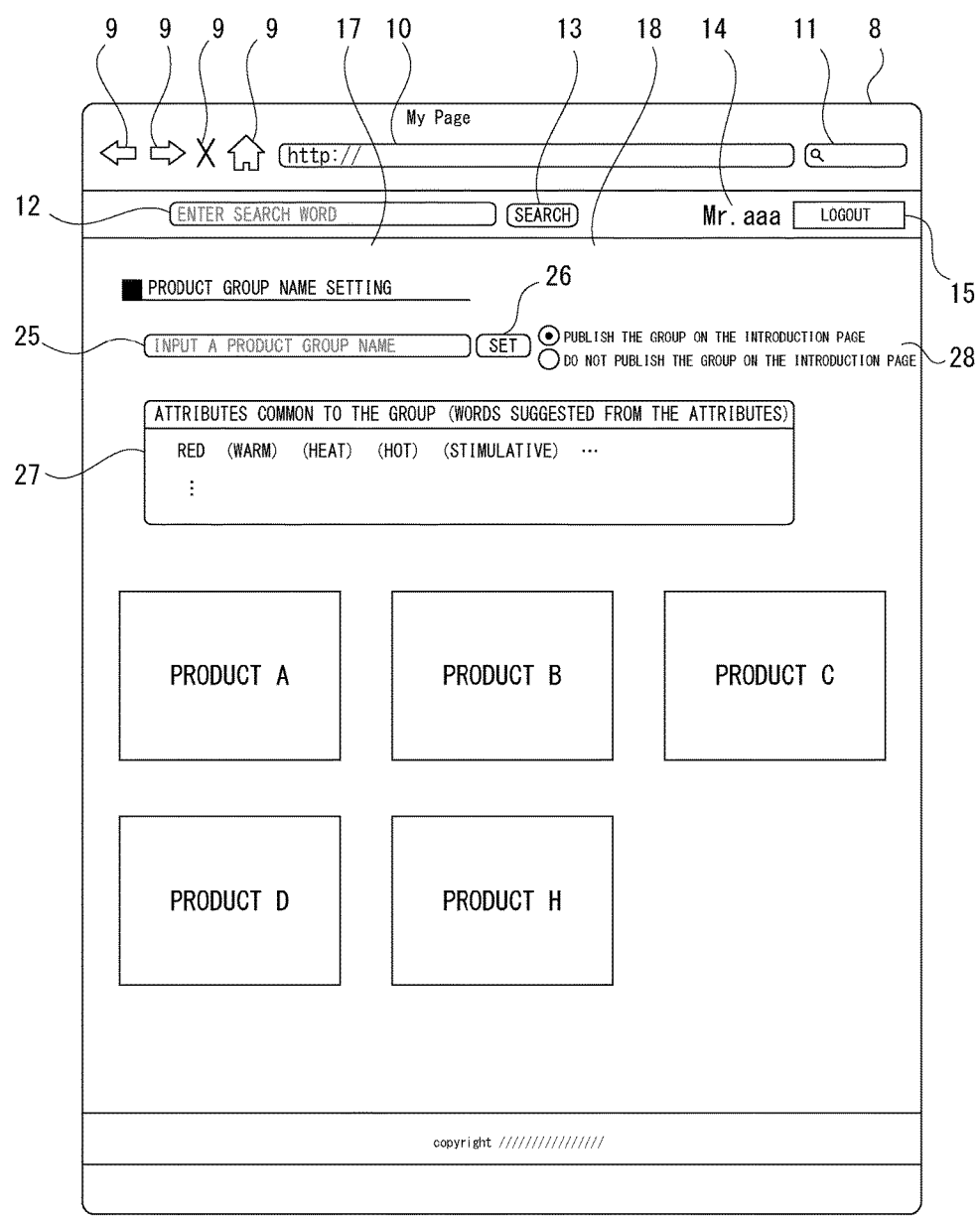
FIG. 10 is a drawing illustrating a screen to which a product group name is to be input.

When a product introducer presses the Group button 24, the web browser 8 displays a product group name input page illustrated in FIG. 10.

The product group name input page in FIG. 10 illustrates the case where the product group is created with the products belonging to a sorting word "red" among the common attributes shown in FIG. 9. The product group name input page includes, for example, a group name input form 25, a Set button 26, and a word suggestion area 27. A product group name is input to the group name input form 25. The Set button 26 is to determine the input product group name. The word suggestion area 27 displays sorting words common to the selected product groups and words suggested from the sorting words. Below the word suggestion area 27, images of the respective products belonging to the product group or similar data are displayed. Further, on the right side of the Set button 26, public options 28 are arranged. The public options 28 are to select whether to publish the product groups on the product introduction page or not.

The public options 28 include the "Make public the group on the introduction page" option and the "Do not make public the group on the introduction page" option. Here, selecting "Do not publish the group on the introduction page" enters a private group state in which the fact that grouping of the products into the product group is not visible to other users who browse the product introduction page. Therefore, for example, this option can handle the situation where the information on the products to be added to the product group is being collected, and the product group is incomplete; therefore, the product group is not desired to be viewed by other people or a similar situation. Selecting "Publish the group on the introduction page" enters a public group state in which the product-grouped product group is visible to other users who browse the product introduction page.

When selecting "Do not publish the group on the introduction page", even if the group name input form 25 is blank, the Set button 26 may be able to be pressed.

The product introduction support device 1 causes the word suggestion area 27 to display sorting words and the words suggested from the sorting words. This gives an idea regarding the product group name to the product introducer, assisting creation of unique product group name.

In FIG. 10, although the word suggestion area 27 displays a sorting word "red", when this product group has other common sorting words, the word suggestion area 27 also displays such other common sorting words.

On the product group name input page in FIG. 10, inputting a product group name to the group name input form 25 and pressing the Set button 26 causes the product introduction support device 1 to perform the name determination processing. The name determination processing compares the input product group name with unrecommended names. The details of the name determination processing will be described later.

Figure 11:
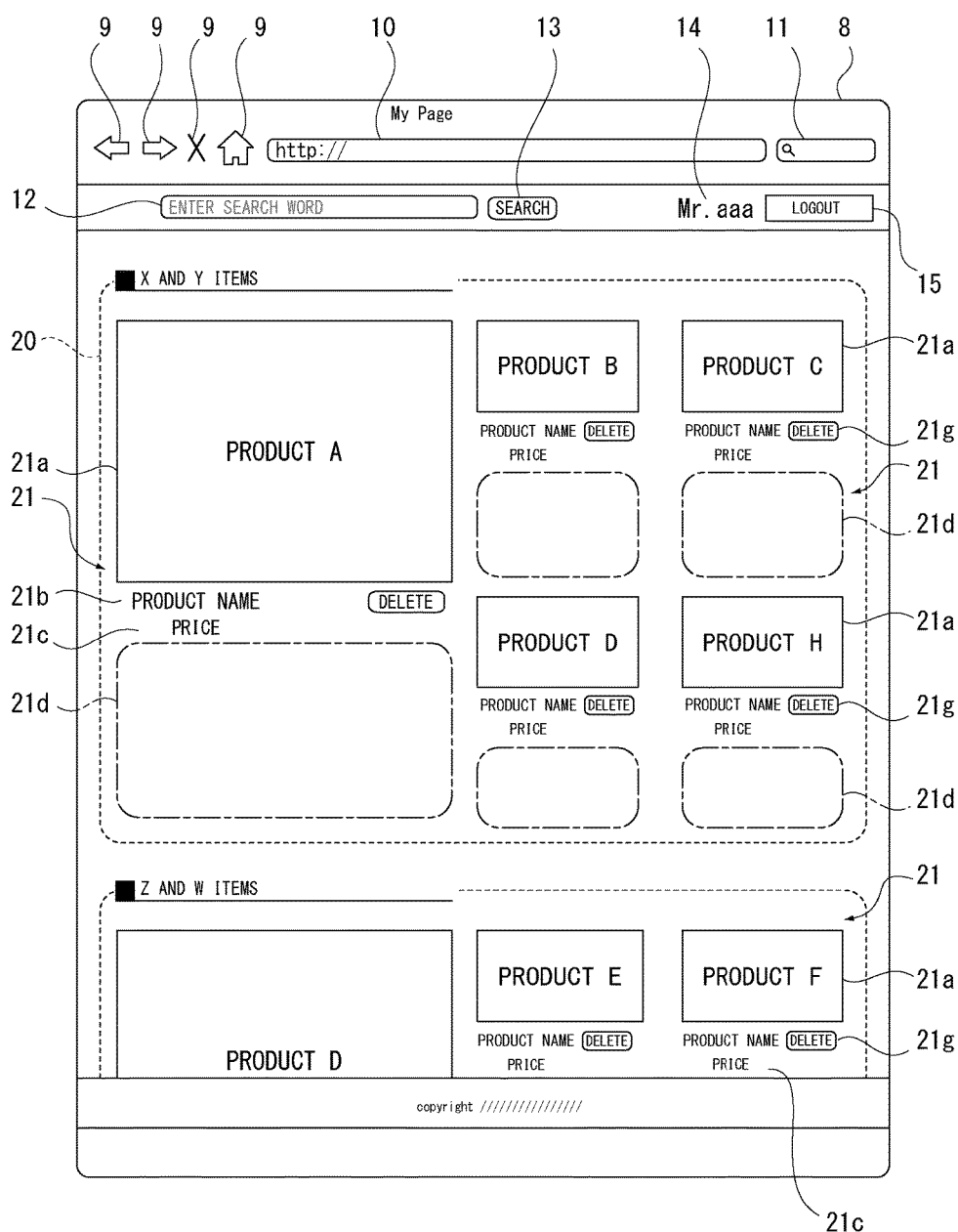
FIG. 11 is a drawing illustrating a screen for confirming a grouped state of some products.

As the result of the name determination processing, if it is determined that an input product group name is not an unrecommended name, as illustrated in FIG. 11, a confirmation page to confirm the grouped state of some products is displayed. Here, a product group with the product group name "X and Y items" constituted of the product A, the product B, the product C, the product D, and a product H is displayed. At the further lower part, a product group with the product group name "Z and W items" constituted of the product D, a product E, and a product F . . . is displayed.

Here, the product D is displayed belonging to both product groups. Since the product D is evaluated from different points of view, an improvement in sales opportunity of the product D can be ensured.

Alternatively, one product may be displayed only at any one among a plurality of product groups. This allows reducing stress felt by a user (a purchaser) from seeing an identical product coming up again and again.

Figure 12:
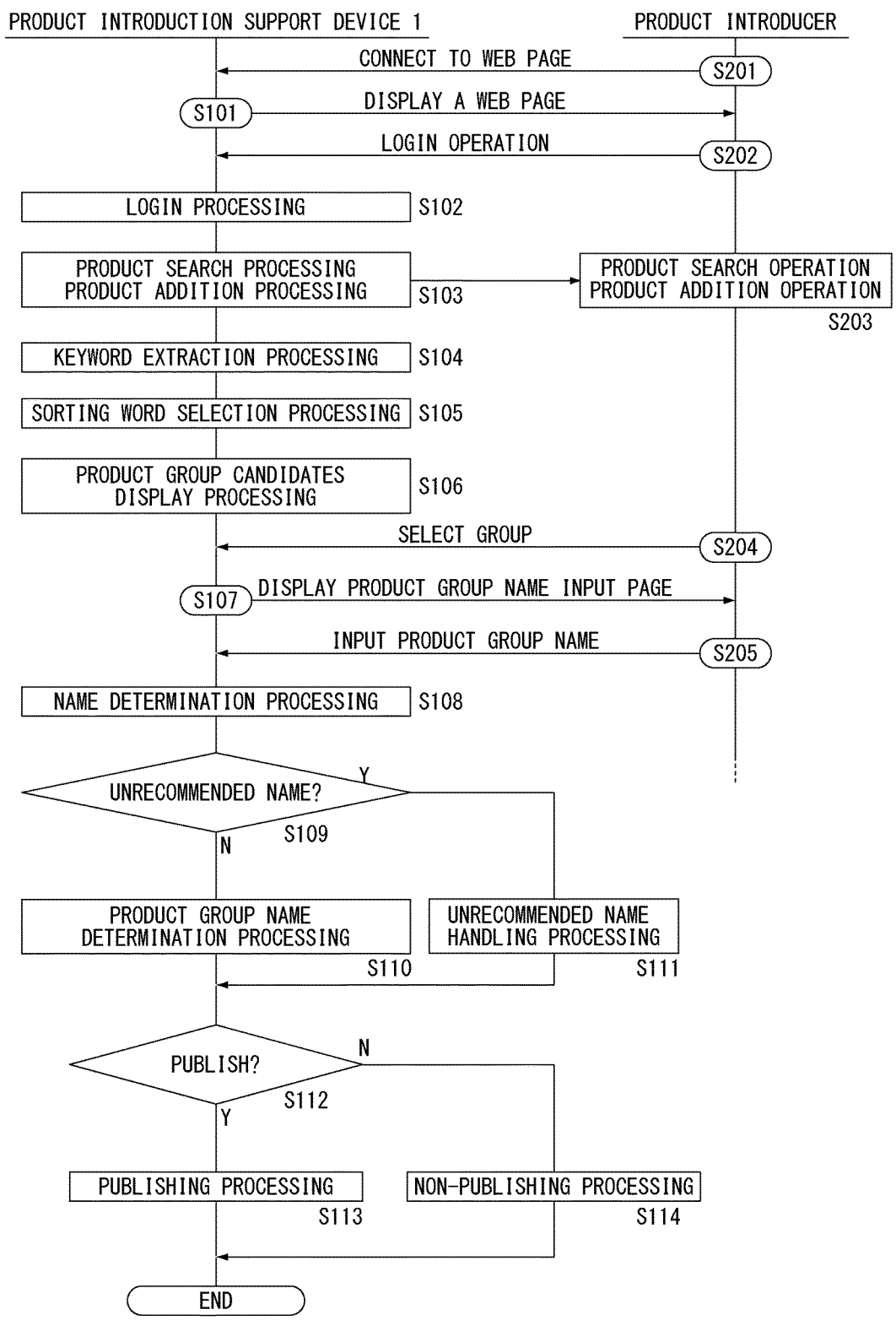
FIG. 12 is a drawing illustrating an outline of a flow of entire processing.

Next, the following describes the entire procedure described above from the aspect of processing performed by the product introduction support device 1 based on FIG. 12.

First, at Step S201, in the case where the connection of a product introducer to the product introduction support device 1 via the communications network 5 is performed using, for example, a web browser, the product introduction support device 1 performs processing of displaying a web page at Step S101.

Subsequently, when the product introducer performs a login operation at Step S202, the product introduction support device 1 performs login processing at Step S102. Since this login processing is not changed at all from the conventional technique generally considered, the details of the login processing are omitted. After the login, the product introducer and the product introduction page owned by the product introducer or similar information can be associated. Accordingly, in the following processing, the information is transmitted and received appropriately with the introduction page DB 6a of the product introduction assistance DB 6. For example, when the product introducer edits the product introduction page of himself/herself, the product introduction support device 1 receives the product information of the products arranged on the product introduction page, information on the arrangement of the products, or similar information from the introduction page DB 6a.

Next, Step S103 and Step S203 search products and add products to the product introduction page. Specifically, at Step S203, when the product introducer performs a product search operation, at Step S103, the product introduction support device 1 performs product search processing. At this time, the product introducer instructs a search word and a search method, thus performing the product search processing based on the instructions. The product search processing performs the category search based on a product category selected in the drop-down list form 19, which is illustrated in FIG. 5, processing of displaying the search page to display the search result, which is illustrated in FIG. 6, or similar processing. At Step S203, the product introducer performs a product addition operation that selects a product to be added to the product introduction page from the respective products illustrated in FIG. 6. Then, at Step S103, for example, like the edit page illustrated in FIG. 7, the product addition processing that arranges the products selected by the product introducer on the arranged product area 20 is performed. When the product introducer adds a plurality of products to the product introduction page, two processing of the product search processing and the product addition processing are appropriately repeated. Thus, the products are arranged on the arranged product area 20.

When the product introducer terminates the product search and product addition operations, the processing transitions to Step S104. Specifically, this corresponds to the case where the product introducer presses the Complete Edit button 22, which is illustrated in FIG. 8 or a similar case.

At Step S104 in FIG. 12, the keyword extraction part 1b of the product introduction support device 1 performs keyword extraction processing. The keyword extraction processing is processing of extracting keywords for the respective products added by the product introducer. The keyword extraction processing is processing of extracting keywords from the information on the respective products or similar information stored in the product DB 7, which is coupled to the EC server 2. For example, as described above, from the product "red chair", for example, attributes such as "red", "chair", and "furniture" are extracted as the keywords. Besides, the keyword extraction processing extracts keywords based on various attributes, such as a place of production, a color, and a material. By acquiring the information from the keyword DB 6b, the keyword extraction processing searches words suggested from keywords. For example, the keyword extraction processing also acquires the words associated to "red", such as "warm", "heat", and "simulative." This can be achieved by, for example, associating the keyword "red" with words suggested from the keyword as illustrated in FIG. 13A and storing the keyword and the phrases in the keyword DB 6b of the product introduction assistance DB 6.

The keyword extraction processing may extract keywords from the user information of the product introducer. For example, in the case where the product introducer posts a comment or a similar remark of himself/herself on a product placed on the product introduction page of himself/herself, the keyword extraction processing may extract keywords from the information. As one example, when the product introducer posts a comment "feels comfortable with seating" to the product, "red chair", the keyword extraction processing may extract a keyword "comfort with seating." Here, the user information means some sort of composition that the product introducer writes on a product or a similar composition.

The keyword extraction processing is also performed on the products that have already been added prior to the sequence of operations of the product addition of this time. The keywords regarding the products added before the operation of this time are, for example, associated with the products as illustrated in FIG. 13B and are stored in the keyword DB 6b. FIG. 13B illustrates an example where both the keywords directly extracted from the products and the words suggested from these keywords are stored. However, only the keywords directly extracted may be stored. In this case, for example, the words suggested from the keywords are searched from the table illustrated in FIG. 13A or a similar table whenever necessary.

Next, at Step S105, the sorting word selection part 1c of the product introduction support device 1 performs sorting word selection processing. The sorting word selection processing first searches a keyword common to two or more products from the keywords (includes the suggested words) for the respective products extracted at Step S104. At this time, the searched keywords are set as sorting words. Next, in the case where the count of searched sorting words is many, as necessary, the sorting words presented to the product introducer are chosen. The sorting words may be chosen by, for example, selecting words that can be used as a product group name. Alternatively, the sorting words may be selected simply in an order from the larger count of products having the sorting word as a keyword. Alternatively, the sorting word may not be chosen but the all acquired sorting words may be selected.

Subsequently, at Step S106, the group presentation part 1d of the product introduction support device 1 presents combinations of products that can be grouped among the products selected by the product introducer. The combinations of the products that can be grouped may be presented by displaying the sorting words acquired at Step S105. Alternatively, the combination may be presented by not displaying the sorting words but displaying the grouped products. For example, as illustrated in FIG. 9, both the sorting words and the products belonging to the sorting words may be displayed to present the combinations of the products.

Next, at Step S204 in FIG. 12, the product introducer performs an operation of selecting candidates to be grouped from the product group candidates presented by the group presentation part 1d.

Subsequently, at Step S107, the product introduction support device 1 performs processing of displaying the product group name input page as illustrated in FIG. 10.

After the product introducer inputs a product group name at Step S205, at Step S108, the name determining part 1e of the product introduction support device 1 performs the name determination processing. The name determination processing compares the input product group name with unrecommended names to determine whether the product group name has uniqueness and originality. Some examples of the name determination processing will be described later.

Next, at Step S109, the product introduction support device 1 performs a branching according to the result of the name determination processing at Step S108.

At Step S109, when the product introduction support device 1 determines that the input product group name is not an unrecommended name, at Step S110, the product introduction support device 1 performs product group name determination processing. The product group name determination processing, for example, stores a list of the determined product group names and the products included in the product groups in the product group DB 6c. Further, when a user purchasing products browses the product introduction page of a product introducer, the product introduction support device 1 performs processing required to display clearly the products bracketed as the product group determined here and the product group name as well. Specifically, the information on the product group created by a product introducer here is added to the introduction page DB 6a of the product introduction assistance DB 6.

Further, when a user purchases a product from the product group posted on the introduction page of a product introducer, the product group DB 6c may store the purchase result information. In this case, the product introducer who creates the product group and the purchase result of the product are associated and stored.

In the case where the product group name input at Step S109 is determined as an unrecommended name, Step S111 performs unrecommended name handling processing. Some examples of the unrecommended name handling processing will be described later.

Next, at Step S112 in FIG. 12, the product introduction support device 1 determines whether to publish the product group or not. This determination is made, for example, according to the selected situation of the public options 28 in FIG. 10. When determining to publish a product group, the product introduction support device 1 performs publishing processing at Step S113. When determining not to publish a product group, the product introduction support device 1 performs non-publishing processing at Step S114.

The publishing processing is, for example, processing of assigning a public flag to the information on a product group stored in the product group DB 6c at Step S110.

The non-publishing processing is, for example, processing of assigning a private flag to the information on a product group stored in the product group DB 6c at Step S110.

When terminating the publishing processing at Step S113 or the close processing at Step S114, the sequence of processing shown in FIG. 12 terminates.

The above describes that after the processing of Step S113 or Step S114, the sequence of processing terminates. However, a plurality of product groups may be continuously created. In this case, by returning the processing to Step S106 after Step S113 or Step S114, a list of the remaining candidates for a product group as illustrated in FIG. 9 may be displayed. Then, by selecting the product group candidates by the product introducer at Step S204, the processing may proceed to Step S107. In this case, a button to terminate creating a product group (for example, an "End Creation Of Product group button") or a similar element may be arranged on the web page displayed at Step S106 as illustrated in FIG. 9. When a product introducer presses the button, the sequence of processing shown in FIG. 12 may be terminated.

FIG. 12 shows an outline of the procedure of processing. Therefore, FIG. 12 omits, for example, some processing, such as the display processing of each web page performed by the product introduction support device 1, and some input operations performed by a product introducer.

Figure 14:
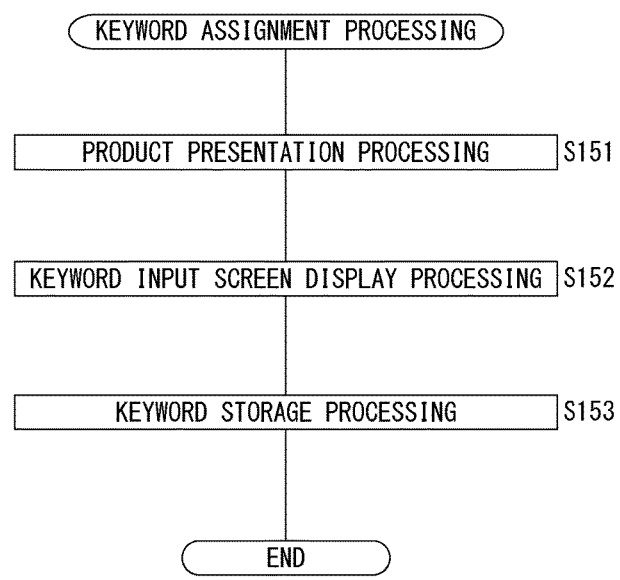
FIG. 14 is a drawing illustrating keyword assignment processing.

Although FIG. 4 to FIG. 11 do not illustrate, the edit page in FIG. 4 or a similar page may include a button, a menu, or a similar element to assign to a product a keyword unique to a product introducer. For example, in the case where disposing a "Assign Keyword" button as a button to assign a keyword unique to a product introducer, pressing the button performs keyword assignment processing as shown in FIG. 14.

In the keyword assignment processing, the product introduction support device 1 performs product presentation processing to select a product to which a keyword is assigned at Step S151.

When a product introducer selects a product to which a keyword is assigned, subsequently, the product introduction support device 1 performs keyword input screen display processing at Step S152. The keyword input screen displays, for example, information on a target product to which the keyword is assigned, an input form to input an assigning keyword, and a determination button to determine the input keyword.

Next, when a keyword is determined by an input of a product introducer, at Step S153, the product introduction support device 1 performs keyword storage processing to store the keyword to the product. The keyword storage processing associates a product with a keyword and, for example, stores the product and the keyword in the keyword DB 6*b*.

4. Exemplary Name Determination Processing

Next, the following describes the name determination processing at Step S108 and the unrecommended name handling processing at Step S111 in FIG. 12 with some examples in FIG. 15A to FIG. 16B.

4-1. First Exemplary Processing

Figure 15A:
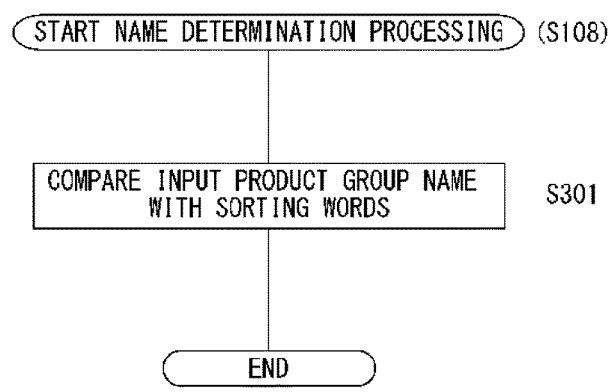
FIGS. 15A and 15B are drawings illustrating first and second exemplary processing of name determination processing.

FIG. 15A illustrates the name determination processing as the first exemplary processing. The first exemplary processing compares an input product group name with a sorting word to determine whether the product group name is an unrecommended name or not. Specifically, at Step S301, the name determining part 1*e* of the product introduction support device 1 compares a product group name input to the group name input form 25 with a sorting word shown in the word suggestion area 27 in FIG. 10. When the product group name matches the sorting word, the name determining part 1*e* determines the product group name as an unrecommended name. For example, as illustrated in FIG. 10, while "red" is presented as a sorting word, if inputting "red" alone to the group name input form 25, the name determining part 1*e* regards that "red" has no uniqueness and determines "red" as an unrecommended name.

Here, the following describes some examples of the unrecommended name handling processing at Step S111 in FIG. 12, which is performed when determining an input product group name as an unrecommended name.

In the unrecommended name handling processing, for example, the product introduction support device 1 performs alert processing. The alert processing notifies a product introducer of an input product group name being an unrecommended name. This processing may perform the notification by starting a window of a small web browser for this notification on the web browser or by transitioning to a web page for notification. Alternatively, a notification text may be displayed below the group name input form 25 on the product group name input page, which is illustrated in FIG. 10. In this case, to seek attention, displaying the notification text in red letters and bold face is preferable.

Figure 17A:
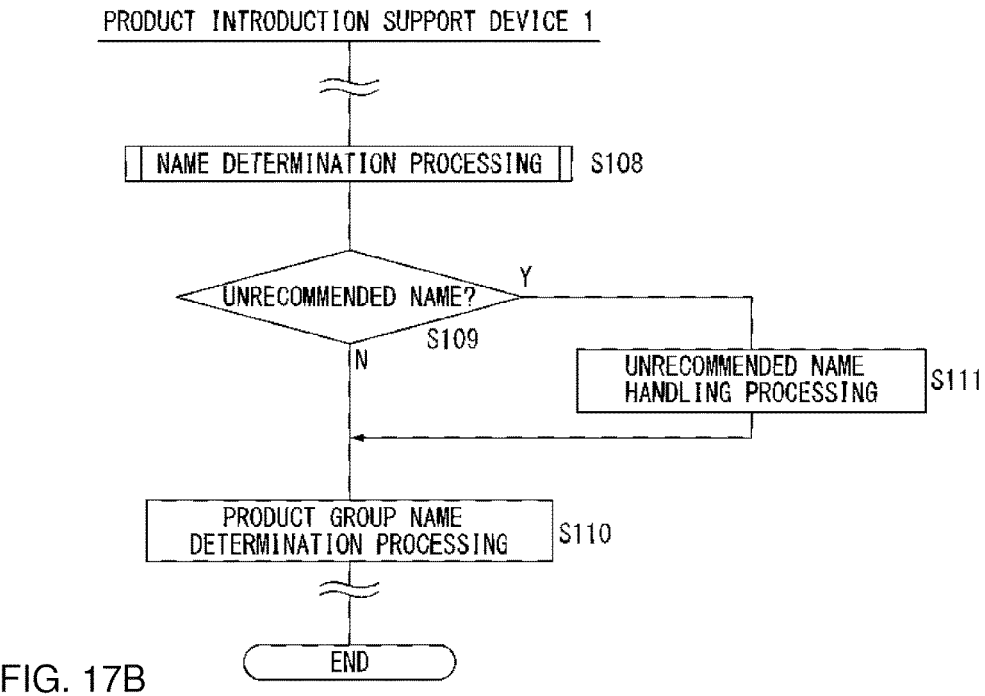
FIGS. 17A and 17B are drawings for describing unrecommended name handling processing and the subsequent processing.

Here, the above-described description using FIG. 12 describes the execution of Step S112 shown in FIG. 12 after the unrecommended name handling processing at Step S111. However, some modifications are possible. Therefore, the following describes the unrecommended name handling processing at Step S111 and subsequent processing using FIGS. 17A and 17B. In the example shown in FIG. 17A, the product introduction support device 1 performs the unrecommended name handling processing at Step S111 and then performs the product group name determination processing at Step S110.

In this case, as the unrecommended name handling processing, Step S111 performs the alert processing to the product introducer. However, in the case where a product introducer determines that a product group name may be an unrecommended name or a similar case, Step S110 assigns the product group name without change. This allows assigning a product group name without increasing the burden of a product introducer, also allowing providing an environment where lack of uniqueness may be notified to a product introducer at the same time.

Figure 17B:
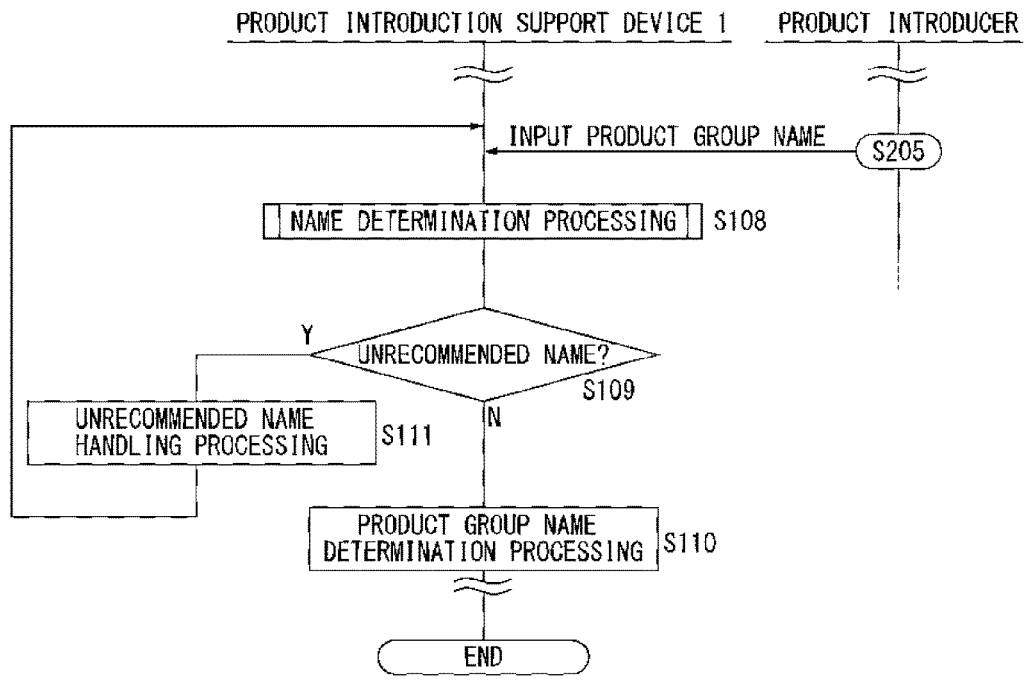

As illustrated in FIG. 17B, when the product introduction support device 1 determines that a product group name is an unrecommended name, the product introduction support device 1 may perform name reassignment processing. The name reassignment processing reassigns a product group name. Here, the name reassignment processing is processing of appropriately repeating Step S111, Step S108, and Step S109 shown in FIG. 17B. Specifically, in the case where an input product group name is an unrecommended name, the product introduction support device 1 performs the alert processing to a product introducer at Step S111. After that, the product introduction support device 1 returns to the processing before the name determination processing at S108 and stands by until the operation at Step S205 is performed.

The name reassignment processing may not permit assigning a name determined as an unrecommended name but may request re-input of a product group name again until an input product group name is determined not an unrecommended name.

In the exemplary name determination processing described later as well, regarding the unrecommended name handling processing, some similar examples are possible. Accordingly, the following omits the explanation of the unrecommended name handling processing.

4-2. Second Exemplary Processing

Figure 15B:
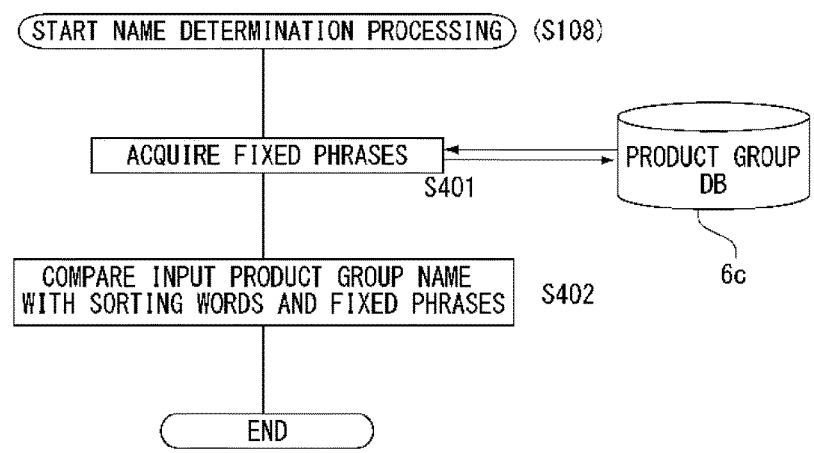
Figure 16A:
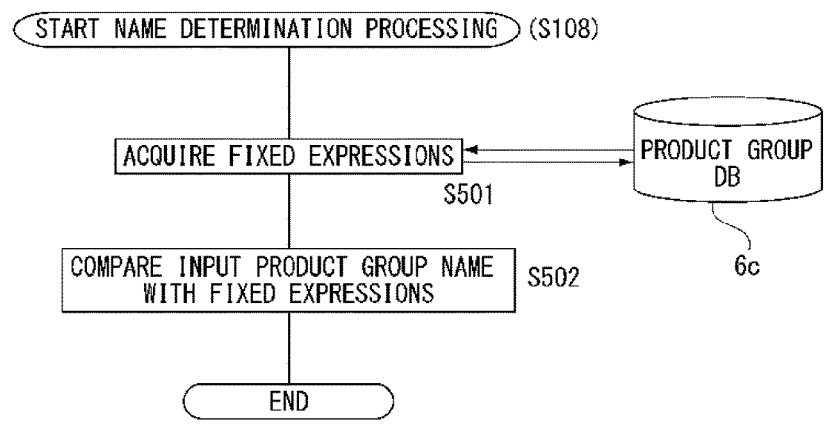
FIGS. 16A and 16B are drawings illustrating third and fourth exemplary processing of the name determination processing.
Figure 16B:
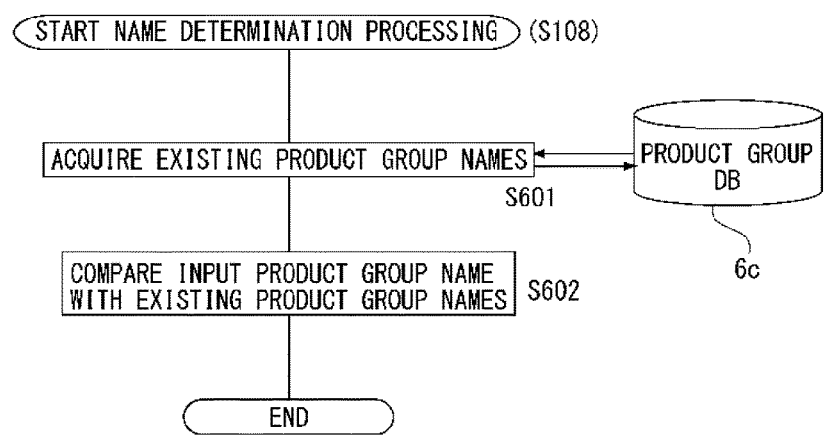

In the case where the product group name input by a product introducer is created by mainly using a sorting word and a fixed phrase regarded as a frequently used phrase as shown in FIG. 15B, the name determination processing as the second exemplary processing determines the product group name as an unrecommended name. First, at Step S401, the product introduction support device 1 acquires fixed phrases from the product group DB 6*c*. Subsequently, at Step S402, the product introduction support device 1 performs processing of comparing an input product group name, sorting words, and fixed phrases.

Here, the use of a sorting word alone and a fixed phrase means the following. For example, in the case where "red" and "item collection" are set as fixed phrases, a product group name "red item collection" is determined as using the fixed phrases alone. To achieve this, the product group DB 6*c* of the product introduction assistance DB 6 preliminary stores fixed phrases.

As another example of the above-described name determination processing, the following describes the case where all the main parts of an input product group names are formed of sorting words and fixed phrases. For example, a part formed by removing a Japanese postpositional particle such as "TE", "NI", "WO", and "HA" and an auxiliary verb from an input product group name is regarded as the main part. The product introduction support device 1 may determine whether the main part is identical to a sorting word and a fixed phrase or not. That is, in the case where "red" is set as a sorting word and "item collection" is set as a fixed phrase, although the product group name "red item collection" includes a Japanese postpositional particle "NO", the product introduction support device 1 determines the product group name as an unrecommended name.

4-3. Third Exemplary Processing

In the case where the product group name input by a product introducer is an identical name to a fixed expression created using the frequently used phrase or a similar word, the name determination processing as the third exemplary processing determines the product group name as an unrecommended name. First, at Step S501, the product introduction support device 1 acquires a fixed expression from the product group DB 6c. Subsequently, at Step S502, the product introduction support device 1 performs processing of comparing an input product group name and fixed expressions. Accordingly, the product group DB 6c of the product introduction assistance DB 6 preliminary stores fixed expressions.

For example, when inputting a product group name "cute, red item collection" to the product group whose sorting word is "red", although this does not correspond to an exemplary unrecommended name described in the second exemplary processing, if the product group DB 6c stores a fixed expression "cute X item collection", the product introduction support device 1 determines the product group name as an unrecommended name. Like this "cute X item collection", the product group DB 6c may store a character string partially including a wild card representing any given characters as a fixed expression.

As another example, in the case where the product group name "cute item collection", which is irrelevant to the sorting word, is input for the product group whose sorting word is "red" as well, when the product group name matches a fixed expression stored in the product group DB 6c, the product introduction support device 1 determines the product group name as an unrecommended name.

4-4. Fourth Exemplary Processing

When a product group name input by the product introducer is identical to the product group name that has already been created, the name determination processing as the fourth exemplary processing determines the product group name as an unrecommended name. First, at Step S601, the product introduction support device 1 acquires existing product group names from the product group DB 6c. Subsequently, at Step S602, the product introduction support device 1 compares an input product group name with the existing product group names. Accordingly, the product group DB 6c of the product introduction assistance DB 6 stores the product group names created by the all product introducers.

This assures the product introducer who has created a novel name and a splendid name of an effect of a certain level of product introduction. This also ensures preventing the existing product group names from being effortlessly imitated.

As the modification of the fourth exemplary processing, it is thought that even if an identical product group name is used, the product group name is permitted until reaching to a certain count. For example, in the case where five is set as the certain count, when four or less identical group name exist, the assignment of this product group name is permitted. If five identical group names have already existed, the assignment of this product group name is not permitted. A value of a predetermined count is preferably set considering a scale of a count of people who use the product introduction support device 1.

This allows reducing burden of a product introducer who assigns the product group names while ensuring the above-described effects to some extent.

Yet another modification is that in the case where a product group in making includes products partially identical to the products included in another product group that has already existed and when inputting a product group name identical to the other product group name, the product group name may be determined as an unrecommended name. Specifically, assume the case where a product group name "item collection of items encouraging a stimulating life" has already been created and a product introducer inputs an identical product group name. When the products constituting the product group are identical to the products constituting another product group by, for example, half or more, the product group name is determined as an unrecommended name.

In other words, even if an identical product group name is input, if the products constituting the product group are all different, the product group name is not determined as an unrecommended name.

Accordingly, even if a product group name is an ordinary product group name, as long as the products constituting the product group are unexpected and unique, the product group name is not determined as an unrecommended name. This allows providing an environment of introducing products from various points of view.

The above-described first exemplary processing to fourth exemplary processing each may be independently performed. Meanwhile, the plurality of exemplary processing may be performed simultaneously. For example, the product introduction support device 1 may perform the first exemplary processing and the third exemplary processing. Alternatively, the product introduction support device 1 may perform all the first exemplary processing to the fourth exemplary processing.

5. Modifications

The above-described embodiments determine whether a product group name is an unrecommended name or not to determine the uniqueness of the product group name. However, the uniqueness may be determined by combination of products. That is, when creating a product group with the combination of products not introduced by other product introducers, it is determined that the product group has uniqueness. Accordingly, the product introduction support device 1 can propose not only a product group name but also a product group having uniqueness also in the combination of products to a product introducer.

When grouping products, in the case where among the products selected by himself/herself, there is a product not belonging to the product group and an product introducer determines that the product may belong to the product group, the product introduction support device 1 may have a function of ensuring newly adding the sorting word common to the product groups to the keyword of the product. For example, with the example of FIG. 9, the products belonging to a sorting word "red" are the products A, B, C, D, and H. However, if a product introducer determines that the product E also may be a product belonging to the sorting word "red", a mechanism that adds "red", which has not existed as the keyword of the product E until then, as the keyword of the product E may be provided. In this case, a mechanism of recommending addition of a keyword for a product may be provided. At the timing when equal to or more than certain recommendation votes are collected, "red" may be added as the keyword for the product E. Therefore, the product introduction support device 1 provides the mechanism of adding a keyword regarding a new attribute to a product, ensuring providing the environment of introducing products from various points of view.

When displaying the product group candidates, the example of highlighting product group candidates to which many products belong is described above. However, a product group candidate having a sorting word that is not used for other product groups so much may be highlighted. This allows the product introduction support device 1 to propose a product group that is likely to provide uniqueness in the product group name and the combination of bracketed products to a product introducer.

In the above-described product group candidate presentation processing, the examples of presenting a list of the sorting words and products are described; however, items other than those may be presented. For example, when selecting a plurality of low-price products, as well as presenting "low-price", "cheap", "bargain", and a similar word as sorting words, a total sum may be presented. This assists the product introducer to conceive a product group name such as "a complete set of X by total sum Y Yen". Therefore, the product introduction support device 1 can provide an environment of creating an opportunity to conceive product group names from further various points of view.

Further, the product group candidate presentation processing may present additional information such as another photograph, image, or similar information regarding a product. This allows viewing products from various aspects, ensuring providing an environment with opportunities to conceive a new product group name.

6. Summary

The above-described product introduction support device 1 includes the display control part 1a, the keyword extraction part 1b, the sorting word selection part 1c, and the group presentation part 1d. The display control part 1a is configured to create display control information (for example, a program source code) to arrange a plurality of selected products in a browsable state on a web. The keyword extraction part 1b is configured to extract a keyword representing an attribute for each of the plurality of the selected products. The sorting word selection part 1c is configured to select at least one keyword common to or similar to a plurality of products among the keywords extracted by the keyword extraction part 1b as a sorting word. The group presentation part 1d is configured to perform processing of presenting candidates for a product group that are bracketable by the sorting word among the plurality of selected products. This gives ideas to group products from the various points of view to a product introducer, ensuring providing an environment to promote grouping the products with uniformity.

The product introduction support device 1 includes the name determining part 1e. The name determining part 1e is configured to perform name determination processing to compare a group name input for a product group with an unrecommended name. The name determining part 1e is configured to perform unrecommended name handling processing when this name determination processing determines the group name as an unrecommended name. Therefore, the execution of the name determination processing that determines a product group name adds characteristics unique to a product introducer to the product introduction page on which the products are introduced by the product introducer, ensuring providing promotion of product sales.

Here, the following describes an exemplary environment to which the product introduction support device 1 is applied. For example, in the real world, a shop such as a select shop, which introduces and sells products selected by sensitivity of his/her own, exists. For virtual experience of such environment, the product introduction support device 1 provides a virtual web page on the communications network 5, such as the Internet, for each product introducer (equivalent to a select shop owner in the real world). The product introduction support device 1 provides an environment where a product introducer can introduce products effectively employing the personal characteristics and uniqueness of the product introducer himself/herself on the web page. That is, the product introduction support device 1 provides a product introducer with the environment like a select shop in the real world, ensuring providing an environment where a product introducer introduces products selected in accordance with the sensitivity unique to the product introducer.

Further, the product introduction support device 1 provides an environment of grouping products with a certain criterion (for example, "cheap product" and "red product") among the products selected by a product introducer. This ensures providing the product introduction page to which a product introducer is likely to realize their personal characteristics. Additionally, since the products are grouped according narrowed-down criteria, a purchaser who purchases products also can easily see and find the product.

However, to fully realize the characteristics of a product introducer, it is important that not only products are grouped but also a product group name to the product group has personal characteristics and uniqueness. As a product group name becomes personal and unique, the product group name attracts the attentions of purchasers, ensuring stimulating a consumer appetite to the products.

Therefore, the product introduction support device 1 prepares the environment of grouping the products and also provides an environment to make a name of the product group to be more characteristic and unique. This provides an environment where a product introducer can introduce the products fully realizing the personal characteristics.

When implementing such product introduction support device 1, a plurality of product introducers introduce one product from various perspectives so as to meet various needs from a product purchaser side, allowing providing an environment where an opportunity of purchasing products can be maximally utilized.

As described in the first exemplary processing, the name determination processing determines a group name input when the input group name is formed of a sorting word alone as an unrecommended name. For example, as described above, when attempting to assign a product group name "red" to a product group formed of a sorting word "red", the product group name is determined as an unrecommended name.

As described in the second exemplary processing, the name determination processing determines a group name input as an unrecommended name when a main part of the input group name is formed of a sorting word and a fixed phrase. For example, as described above, in the case where a sorting word "red" and a fixed word "item collection" exist, a product group name "red item collection" is determined as an unrecommended name.

Further, as described in the third exemplary processing, the name determination processing determines an input group name when the input group name matches a fixed expression as an unrecommended name. For example, when attempting to assign a product group name "red item collection" in a state where the product group DB 6c stores a fixed expression "red item collection", the name determination processing determines the product group name as an unrecommended name.

Implementing the above-described respective name determination processing inhibits assignment of a non-original product group name and product group name lacking personal characteristics.

Further, as described in the fourth exemplary processing, when an input group name is used as a group name assigned to an existing product group by a certain count or more, the name determination processing is configured to determine the input group name as an unrecommended name. This assures a product introducer who has conceived a novel name and a splendid name of an effect of a certain level of product introduction. This also ensures preventing another product introducer from effortlessly imitating the product group names. For example, when a product introducer attempts to effortlessly imitate the product group name created by another product introducer, if the product groups to which the product group name has been assigned have already been present by the certain count or more, the name determination processing determines the product group name as an unrecommended name, prompting the product introducer to input another product group name.

As described in the first exemplary processing, the unrecommended name handling processing performs the alert processing, which notifies that an input group name is an unrecommended name. This allows notifying a product introducer of the input product group name being an unrecommended name. This ensures providing an environment of contributing to creation of a product group reflecting the individuality of the product introducer.

Further, as described in the first exemplary processing, the unrecommended name handling processing performs the name reassignment processing, which requests renaming a group name. This ensures providing an environment that avoids a product group name being an unrecommended name and prompts a product introducer to input a unique product group name.

For example, in the case of an input group name being determined as an unrecommended name, the re-input of the product group name is prompted on the product group name input page, which is as illustrated in FIG. 10.

In the name determination processing, in the case where a product group name is determined as an unrecommended name since the product group name corresponds to a name slandering other people, a name offensive to public order and morals, or the name including a prohibited word on radio and television or a similar word, as shown in FIG. 17B, until the product group name which is not an unrecommended name is input, the name determination processing urges a product introducer to input a product group name again. In this case, the product group DB 6c stores a list of names, such as slandering names by which re-inputting a product group name is required, and a list of names, such as non-unique names where re-inputting the product group name is not always required so as to be distinguished from one another. Only when inputting a product group name by which re-inputting a product group name is required, until a product group name which is not an unrecommended name is input, the name determination processing may urge a product introducer to input a product group name again.

Further, as described using FIG. 9, the group presentation part 1d of the product introduction support device 1 presents the candidates for a product group by presenting sorting words. Thus, the group presentation part 1d directly shows keywords as the attribute information common to the products. This ensures providing the environment of making a clear picture of product groups.

As described using FIG. 9, the group presentation part 1d of the product introduction support device 1 is configured to filter and display respective products belonging to product groups based on the sorting words, depending on the sorting words. Since this displays only the product-grouped products, this ensures providing an environment of making a clearer picture of product grouped.

For example, as product group candidates, when presenting a sorting word "red" and a sorting word "Europe", the group presentation part 1d displays only the products belonging to the sorting word "red". This allows making a clear picture of the entire product group, ensuring contributing to creation of a unique product group name.

Further, as described using FIG. 9, when a plurality of sorting words are presented, the group presentation part 1d of the product introduction support device 1 highlights the sorting word of a product group to which many products belong to present the sorting word. This ensures contribution to creation of product groups to which further many products belong to. Accordingly, when creating a product group to which many products belong, the product introduction page that has uniformity among introduced products can be created.

Further, as described at Step S106, the keyword extraction part 1b of the product introduction support device 1 is configured to extract keywords also from information on a product introducer who introduces a product. The sorting word selection part 1c is configured to select a sorting word from words including the keywords extracted from the information on the product introducer. This ensures providing an environment of promoting input of a product group name unique to the product introducer. For example, as described above, from the user information, such as comments by a product introducer on a product, the keyword extraction part 1b extract keywords. This promotes inputting unique product group names.

As described above, the keyword extraction part 1b of the product introduction support device 1 is configured to acquire words suggested from a keyword together with the extraction of the keyword. This allows presenting a variety of sorting words when the group presentation part 1d presents a product group, ensuring providing an environment of assigning a unique product group name.

Further, as described using FIG. 9, the sorting word selection part 1c of the product introduction support device 1 is configured to further select a common or a similar keyword among respective products belonging to the bracketed product groups as a sub-sorting word. The group presentation part 1d is configured to present candidates for a product group that are bracketable by the sorting word and the sub-sorting word. This allows proposing a product group with further narrowed-down criteria. For example, the product group having not only the common attribute "red", but also having the common attribute "red interior" becomes a product group with further narrowed-down criteria. This ensures providing an environment of contributing to creation of the product introduction page with more uniformity.

Further, the keyword extraction part 1b of the product introduction support device 1 is configured to reflect a situation unique to a product introducer to extract a keyword unique to the product introducer assigned to a product. The sorting word selection part 1c is configured to select a sorting word from keywords including the keywords unique to the product introducer. This provides an environment of creating a product group unique to the product introducer. To a product that the product introducer intends to group in the near future, a keyword unique to the product introducer is assigned, ensuring providing a use aspect like a reminder for grouping.

Further, the display control part 1a of the product introduction support device 1 is configured to create display control information. The display control information is configured to display an option to select a private group state and a public group state. In the private group state, that a product group selected from the presented candidates for a product group is bracketed by a sorting word is not visible to others on the web. In the public group state, that a product group is bracketed by a sorting word is visible to others on the web. This provides an environment where the state of the product group to which the product introducer has not decided whether to product-group or not, a state in the middle of collecting the products to be product-grouped, or a similar state can be stored.

7. Program and Storage Medium

The product introduction support device 1 as the embodiments of the information processing device of the present invention is described above. The program of the embodiments is a program that causes an information processing device (CPU or a similar unit) to execute the processing in the product introduction support device 1.

A program that causes an information processing device to execute display control processing configured to create display control information to arrange a plurality of selected products in a browsable state on a web. The program also causes the information processing device to execute keyword extraction processing configured to extract a keyword representing an attribute for each of the plurality of selected products. Further, the program also causes the information processing device to execute sorting word selection processing configured to select at least one keyword common to or similar to a plurality of products among the keywords extracted by the keyword extraction processing as a sorting word. Further, the program also causes the information processing device to execute group presentation processing configured to perform processing of presenting candidates for a product group that are bracketable by the sorting word among the plurality of selected products.

That is, this program is a program causing the product introduction support device 1 to perform the respective processing shown at Step S101 to Step S106 in FIG. 12.

This program allows realizing the information processing device as the above-described product introduction support device 1.

Such program can be preliminary recorded in an HDD as a recording medium built into a device such as a computer device, a ROM in a microcomputer including a CPU, or a similar medium. Alternatively, a removable recording medium, such as a semiconductor memory, a memory card, an optical disk, a magneto-optical disk, or a magnetic disk, can store (record) the program temporarily or permanently. Such removable recording medium can be provided as so-called package software.

Such program can be installed from the removable recording medium to a personal computer or a similar device. Besides, the program can also be downloaded from a download site via a network such as a LAN and the Internet.

REFERENCE SIGNS LIST 1 product introduction support device
1a display control part
1b keyword extraction part
1c sorting word selection part
1d group presentation part
1e name determining part
2 EC server
3 product introducer terminal
4 user terminal
5 communications network
6 product introduction assistance DB
6a introduction page DB
6b keyword DB
6c product group DB
7 product DB

What is claimed is:

1. An information processing device, which is communicatively coupled to a terminal of a product introducer through a communication network, the information processing device comprising:
   at least one memory operable to store program code; and
   at least one processor operable to read the program code and operate as instructed by the program code, the program code including:
      display code configured to cause at least one of said at least one processor to generate display control information to arrange a plurality of products, selected through the terminal of the product introducer, in a browsable state on a product introduction webpage managed by the product introducer;
      keyword extraction code configured to cause at least one of said at least one processor to extract a plurality of keywords, each representing an attribute of the respective plurality of selected products;
      word selection sorting code configured to cause at least one of said at least one processor to select, as a sorting word, at least one of the extracted plurality of keywords common to or similar to the plurality of selected products;
      group presentation code configured to cause at least one of said at least one processor to present, on the terminal of the product introducer, candidates for a product group from among the plurality of selected products, and receive from the terminal of the product introducer an input of selecting products of the product group among the presented candidates; and
      code configured to cause at least one of said at least one processor to display, on the terminal of the product introducer, a screen for confirming a grouped state in which the products of the product group are bracketed by the sorting word and displayed with a group name representing the product group on the product introduction webpage, the screen being divided into different product areas on the product introduction webpage occupied by different product groups.

2. The information processing device according to claim 1, further comprising:

name determining code configured to cause at least one of said at least one processor to perform name determination processing to compare the group name input for the product group with unrecommended names, the name determining code further causing at least one of said at least one processor to perform unrecommended name handling processing when the name determination processing determines the group name as an unrecommended name.

3. The information processing device according to claim 2, wherein
the name determining code is further configured to cause at least one of said at least one processor to determine the input group name as an unrecommended name when the input group name is formed of a sorting word alone.

4. The information processing device according to claim 2, wherein
the name determining code is further configured to cause at least one of said at least one processor to determine the input group name as an unrecommended name when a main part of the input group name is formed of a sorting word and a fixed phrase.

5. The information processing device according to claim 2, wherein
the name determining code is further configured to cause at least one of said at least one processor to determine the input group name as an unrecommended name when the input group name matches a fixed expression.

6. The information processing device according to claim 2, wherein
the name determining code is further configured to cause at least one of said at least one processor to determine the input group name as an unrecommended name when the input group name is used as a group name assigned to an existing product group by a certain count or more.

7. The information processing device according to claim 2, wherein
in the unrecommended name handling processing, alert processing to notify that the input group name is an unrecommended name is performed.

8. The information processing device according to claim 2, wherein
in the unrecommended name handling processing, name reassignment processing to request renaming the group name is performed.

9. The information processing device according to claim 1, wherein
the group presentation code is further configured to cause at least one of said at least one processor to present candidates for the product group by presenting the sorting word.

10. The information processing device according to claim 9, wherein
the group presentation code is further configured to cause at least one of said at least one processor to filter and display respective products belonging to the product group based on the sorting word.

11. The information processing device according to claim 9, wherein
the group presentation code is further configured to cause at least one of said at least one processor to when a plurality of sorting words are presented, presenting the plurality of sorting words in such a manner that a sorting word of the product group to which a higher number of products belong to is highlighted.

12. The information processing device according to claim 1, wherein
the keyword extraction code is further configured to cause at least one of said at least one processor to extract the keyword also from information on the product introducer; and
the word selection sorting code is further configured to cause at least one of said at least one processor to select the sorting word from words including the keyword extracted from the information on the product introducer.

13. The information processing device according to claim 1, wherein
the keyword extraction code is further configured to cause at least one of said at least one processor to acquire a word suggested from the keyword together with extraction of the keyword.

14. The information processing device according to claim 1, wherein
the word selection sorting code is further configured to cause at least one of said at least one processor to further select another common or a similar keyword among at least some of the products belonging to the product group as a sub-sorting word; and
the group presentation code is further configured to cause at least one of said at least one processor to present candidates for another product group that are to be bracketed by the sorting word and the sub-sorting word.

15. The information processing device according to claim 1, wherein
the keyword extraction code is further configured to cause at least one of said at least one processor to extract keywords which are assigned to a product by reflecting a condition unique to the product introducer and are unique to the product introducer; and
the word selection sorting code is further configured to cause at least one of said at least one processor to select the sorting word from keywords including the keywords unique to the product introducer.

16. The information processing device according to claim 1, wherein
the display code is further configured to cause at least one of said at least one processor to create display control information to display an option to select a private group state and a public group state, wherein in the private group state, a selected candidate from the presented candidates for the product group that is bracketed by the sorting word is not visible to others on the product introduction webpage, and in the public group state, a selected candidate from the presented candidates for the product group that is bracketed by the sorting word is visible to others on the product introduction page.

17. An information processing method performed by at least one computer processor of an information processing device, which is communicatively coupled to a terminal of a product introducer through a communication network, the information processing method comprising:
generating display control information to arrange a plurality of products, selected through the terminal of the product introducer, in a browsable state on a product introduction webpage managed by the product introducer;
extracting a plurality of keywords, each representing an attribute of the respective plurality of selected products;

selecting, as a sorting word, at least one of the extracted plurality of keywords common to or similar to the plurality of selected products;

presenting, on the terminal of the product introducer, candidates for a product group from among the plurality of selected products, and receive from the terminal of the product introducer an input of selecting products of the product group among the presented candidates; and displaying, on the terminal of the product introducer, a screen for confirming a grouped state in which the products of the product group are bracketed by the sorting word and displayed with a group name representing the product group on the product introduction webpage, the screen being divided into different product areas on the product introduction webpage occupied by different product groups.

18. The information processing method according to claim 17, wherein
name determination processing to compare a group name input for the product group with unrecommended names is performed, and unrecommended name handling processing is performed when the name determination processing determines the group name as an unrecommended name.

19. The information processing method according to claim 18, wherein
the name determination processing is configured to determine the input group name as an unrecommended name when the input group name is formed of a sorting word alone.

20. The information processing method according to claim 18, wherein
the name determination processing is configured to determine the input group name as an unrecommended name when a main part of the input group name is formed of a sorting word and a fixed phrase.

21. The information processing method according to claim 18, wherein
the name determination processing is configured to determine the input group name as an unrecommended name when the input group name matches a fixed expression.

22. The information processing method according to claim 18, wherein
the name determination processing is configured to determine the input group name as an unrecommended name when the input group name is used as a group name assigned to an existing product group by a certain count or more.

23. The information processing method according to claim 18, wherein
in the unrecommended name handling processing, alert processing to notify that the input group name is an unrecommended name is performed.

24. The information processing method according to claim 18, wherein
in the unrecommended name handling processing, name reassignment processing to request renaming the group name is performed.

25. The information processing method according to claim 17, wherein
candidates for the product group are presented by presenting the sorting word.

26. The information processing method according to claim 25, wherein
in presentation of the candidates for the product group, respective products belonging to the product group based on the sorting word are filtered and displayed.

27. The information processing method according to claim 25, wherein
in presentation of the candidates for the product group, when a plurality of sorting words are presented, the plurality of sorting words are presented in such a manner that a sorting word of the product group to which a higher number of products belong to is highlighted.

28. The information processing method according to claim 17, wherein:
in extraction of the keyword, the keyword is extracted from information of the product introducer; and
in selection of the sorting word, the sorting word is selected from words including the keyword extracted from the information of the product introducer.

29. The information processing method according to claim 17, wherein
a word suggested from the keyword is acquired together with extraction of the keyword.

30. The information processing method according to claim 17, wherein:
in selection of the sorting word, another common or a similar keyword among at least some of the products belonging to the product group is selected as a sub-sorting word; and
in presentation of the candidates for the product group, candidates for another product group that are to be bracketed by the sorting word and the sub-sorting word are presented.

31. The information processing method according to claim 17, wherein
in extraction of the keyword, keywords are extracted, the keywords being assigned to a product by reflecting a condition unique to the product introducer and being unique to the product introducer; and
in selection of the sorting word, the sorting word from keywords including the keywords unique to the product introducer is selected.

32. The information processing method according to claim 17, wherein
in generation of the display control information, display control information to display an option to select a private group state and a public group state is generated, wherein in the private group state, the products of the product group that are bracketed by the sorting word is not visible to others on the product introduction webpage, and in the public group state, the products of the product group that are bracketed by the sorting word is visible to others on the product introduction webpage.

* * * * *